(12) United States Patent
Jreij et al.

(10) Patent No.: US 11,500,649 B2
(45) Date of Patent: Nov. 15, 2022

(54) COORDINATED INITIALIZATION SYSTEM

(71) Applicant: Dell Products L.P., Round Rock, TX (US)

(72) Inventors: Elie Jreij, Pflugerville, TX (US); Robert W. Hormuth, Cedar Park, TX (US); Gaurav Chawla, Austin, TX (US); Mark Steven Sanders, Roanoke, VA (US); William Price Dawkins, Lakeway, TX (US); Jimmy D. Pike, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 121 days.

(21) Appl. No.: 17/030,632

(22) Filed: Sep. 24, 2020

(65) Prior Publication Data
US 2022/0091859 A1 Mar. 24, 2022

(51) Int. Cl.
*G06F 9/445* (2018.01)
*G06F 16/23* (2019.01)
*G06F 13/20* (2006.01)

(52) U.S. Cl.
CPC ......... *G06F 9/44505* (2013.01); *G06F 13/20* (2013.01); *G06F 16/2379* (2019.01)

(58) Field of Classification Search
CPC .. G06F 9/44505; G06F 16/2379; G06F 13/20; G06F 11/1417; G06F 9/4401
USPC .......................................................... 713/2
See application file for complete search history.

(56) References Cited

U.S. PATENT DOCUMENTS

| | | | | | |
|---|---|---|---|---|---|
| 5,933,631 A | * | 8/1999 | Mealey | ............... | G06F 11/1417 714/E11.133 |
| 6,098,158 A | * | 8/2000 | Lay | ....................... | G06F 9/4401 711/171 |
| 6,138,234 A | * | 10/2000 | Lee | ....................... | G06F 9/4405 713/2 |
| 6,145,089 A | * | 11/2000 | Le | ....................... | G06F 11/2028 714/E11.02 |

(Continued)

OTHER PUBLICATIONS

International Search Report and Written Opinion, Application No. PCT/US2021/029739, dated Jul. 30, 2021, 16 pages.

*Primary Examiner* — Paul R. Myers
(74) *Attorney, Agent, or Firm* — Joseph Mencher

(57) ABSTRACT

A coordinated initialization system includes a computing system with first and second initialization subsystems coupled to a coordinated initialization subsystem. The coordinated initialization subsystem receives first and second initialization progress information associated with respective first and second initialization subsystem operations performed by the respective first and second initialization subsystems. Using a coordinated initialization database that identifies dependences between the first and second initialization operations, the coordinated initialization subsystem determines that the first initialization progress information identifies a first initialization operation that is going to be performed by the first initialization subsystem and that is dependent on a second initialization operation that is identified by the second initialization progress information and that has not yet been performed by the second initialization subsystem and, in response, causes the first initialization subsystem to pause the first initialization subsystem operations until the second initialization operation has been performed.

20 Claims, 14 Drawing Sheets

(56) References Cited

U.S. PATENT DOCUMENTS

| | | | |
|---|---|---|---|
| 6,948,099 B1* | 9/2005 | Tallam | G06F 11/1417 |
| | | | 714/38.14 |
| 9,225,596 B2 | 12/2015 | Dunn et al. | |
| 10,620,966 B2 | 4/2020 | Zhong et al. | |
| 2003/0005275 A1* | 1/2003 | Lam | G06F 11/1417 |
| | | | 714/E11.133 |
| 2005/0220025 A1* | 10/2005 | Noguchi | H04L 47/10 |
| | | | 370/282 |
| 2008/0059785 A1* | 3/2008 | O'Connell | G06F 9/4418 |
| | | | 711/E12.008 |
| 2010/0235833 A1* | 9/2010 | Huang | G06F 21/575 |
| | | | 710/36 |
| 2012/0154375 A1* | 6/2012 | Zhang | G06F 9/4411 |
| | | | 345/522 |
| 2013/0339780 A1* | 12/2013 | Lin | G06F 11/0793 |
| | | | 714/2 |
| 2014/0129821 A1* | 5/2014 | Tian | G06F 9/4401 |
| | | | 713/2 |
| 2014/0195848 A1* | 7/2014 | Teli | G06F 11/1469 |
| | | | 714/15 |
| 2014/0301198 A1 | 10/2014 | Louzoun et al. | |
| 2015/0100176 A1 | 4/2015 | Shabbir et al. | |
| 2016/0011879 A1* | 1/2016 | Wang | G06F 9/4401 |
| | | | 713/1 |
| 2016/0306624 A1* | 10/2016 | Vangelov | H04L 67/12 |
| 2016/0328300 A1* | 11/2016 | Rahardjo | G06F 11/1417 |
| 2017/0061127 A1* | 3/2017 | Ionescu | G06F 21/575 |
| 2017/0068548 A1* | 3/2017 | Dasar | G06F 9/4401 |
| 2017/0168903 A1* | 6/2017 | Dornemann | G06F 11/2097 |
| 2017/0185488 A1* | 6/2017 | Kumarasamy | G06F 11/1482 |
| 2018/0027063 A1* | 1/2018 | Nachimuthu | G06F 3/0673 |
| | | | 709/226 |
| 2018/0074828 A1* | 3/2018 | Xiao | G06F 11/2284 |
| 2019/0007212 A1* | 1/2019 | Neve de Mevergnies | |
| | | | G06F 21/335 |
| 2019/0012088 A1* | 1/2019 | Chaluvaiah | G06F 3/0608 |
| 2019/0073302 A1* | 3/2019 | Allison | G06F 12/0246 |
| 2019/0102535 A1* | 4/2019 | Boyd | G06F 21/44 |
| 2019/0108039 A1* | 4/2019 | Lei | G06F 9/4406 |
| 2019/0146804 A1* | 5/2019 | Huang | G06F 3/0604 |
| | | | 713/2 |
| 2020/0029320 A1* | 1/2020 | Ryu | H04B 7/088 |
| 2020/0159302 A1* | 5/2020 | Chaiken | G06F 1/24 |
| 2020/0264893 A1 | 8/2020 | Manjunatha et al. | |
| 2020/0394144 A1* | 12/2020 | Osada | G06F 9/4401 |

* cited by examiner

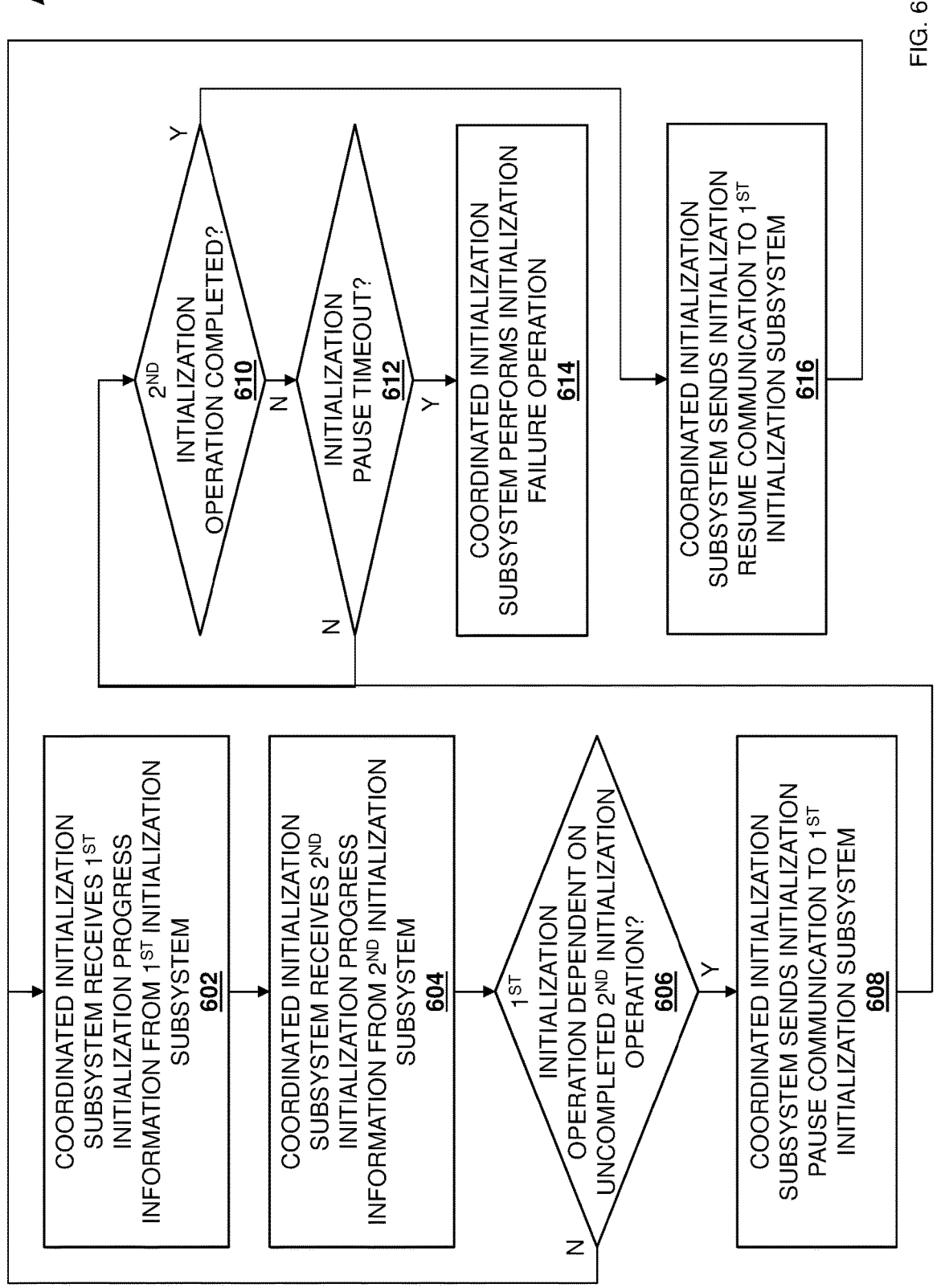

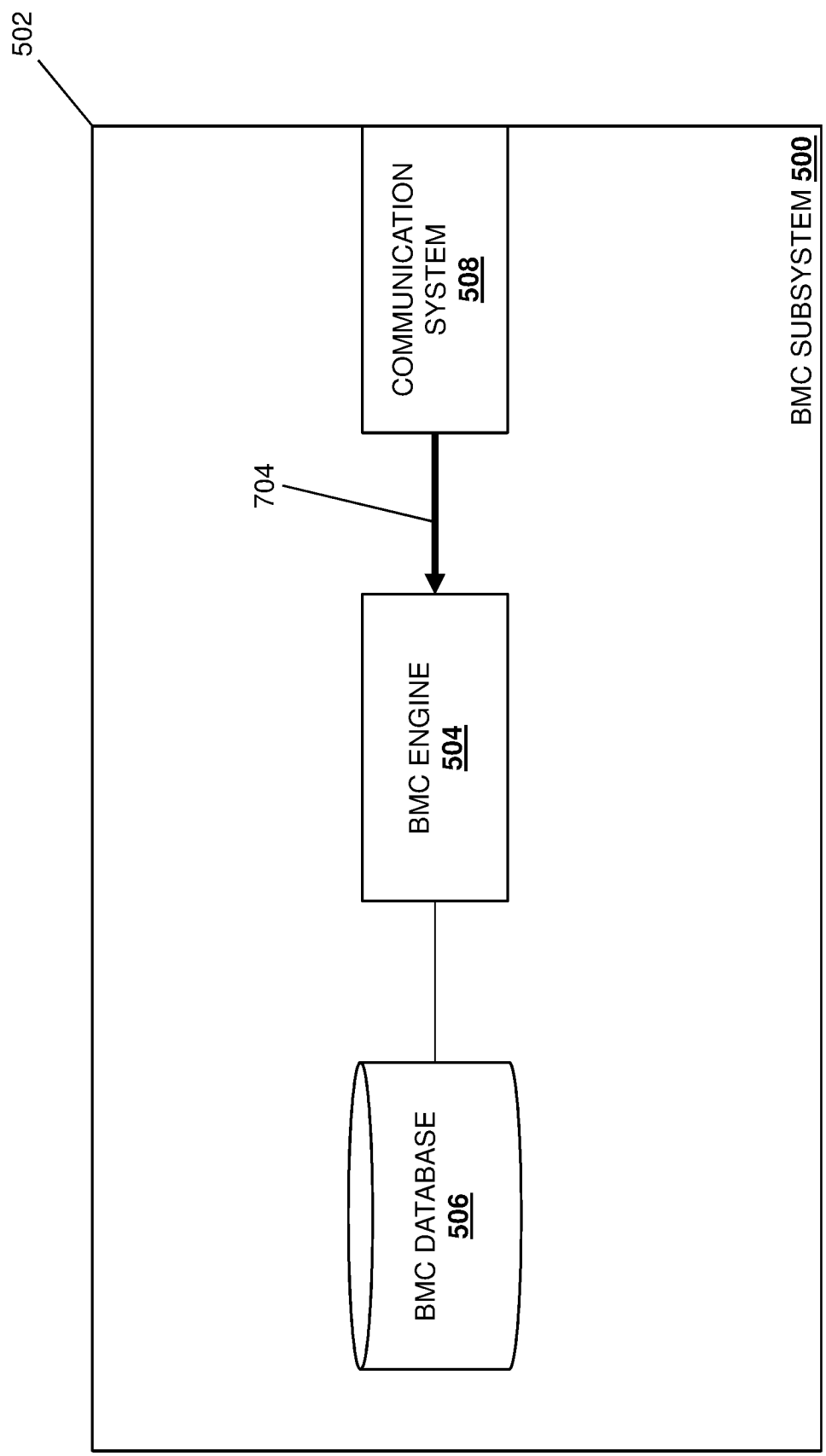

COORDINATED INITIALIZATION SYSTEM

BACKGROUND

The present disclosure relates generally to information handling systems, and more particularly to the coordinating initialization of multiple subsystems in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices and/or other computing systems known in the art, may include multiple subsystems that are each required to perform initialization operations in order to initialize those subsystems and/or the server device. For example, the inventors of the present disclosure have developed a System Control Processor (SCP) subsystem that may be provided in server devices and/or other computing systems in order to provide communication functionality (e.g., Network Interface Controller (NIC) functionality) for the server device/computing system, while also performing perform a variety of advanced functionality for that server device/computing system. However, in addition to a BIOS subsystem in the server device performing BIOS initialization operations in order to initialize the server device, the SCP subsystem must perform SCP initialization operations to initialize the SCP subsystem in order to operate with the server device (e.g., a "Bare Metal Server" (BMS)). Furthermore, the BIOS initialization operations performed by the BIOS subsystem may require one or more SCP initialization operations to have been completed in order to properly initialize the BIOS subsystem, the SCP subsystem, and/or other server device. Conventional initialization systems deal with this issue by having the SCP subsystem begin and complete the SCP initialization operations first, followed by having the BIOS subsystem begin and complete the BIOS initialization operations, which allows for the complete and proper initialization of the BIOS subsystem, the SCP subsystem, and/or other server device, but also increases the time required for initialization and delays the availability of the server device.

Accordingly, it would be desirable to provide an initialization system that addresses the issues discussed above.

SUMMARY

According to one embodiment, a processing system; and a memory system that is coupled to the processing system and that includes instructions that, when executed by the processing system, cause the processing system to provide a coordinated initialization engine that is configured to: receive, from a first initialization subsystem in a computing system subsequent to an initialization command being provided to the computing system, first initialization progress information associated with first initialization subsystem operations performed by the first initialization subsystem; receive, from a second initialization subsystem in the computing system subsequent to the initialization command being provided to the computing system, second initialization progress information associated with second initialization subsystem operations performed by the second initialization subsystem; determine, using a coordinated initialization database that identifies dependences between the first initialization subsystem operations and the second initialization operations, that the first initialization progress information identifies a first initialization operation that is going to be performed by the first initialization subsystem and that is dependent on a second initialization operation that is identified by the second initialization progress information and that has not yet been performed by the second initialization subsystem; and cause, in response to determining that the first initialization operation that is going to be performed by the first initialization subsystem is dependent on the second initialization operation that has not yet been performed by the second initialization subsystem, the first initialization subsystem to pause the first initialization subsystem operations until the second initialization operation has been performed.

BRIEF DESCRIPTION OF THE DRAWINGS

FIG. 6 is a flow chart illustrating an embodiment of a method for coordinating initialization of multiple subsystems in a computing system.

FIG. 7C is a schematic view illustrating an embodiment of the BMC subsystem of FIG. 5 operating during the method of FIG. 6.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
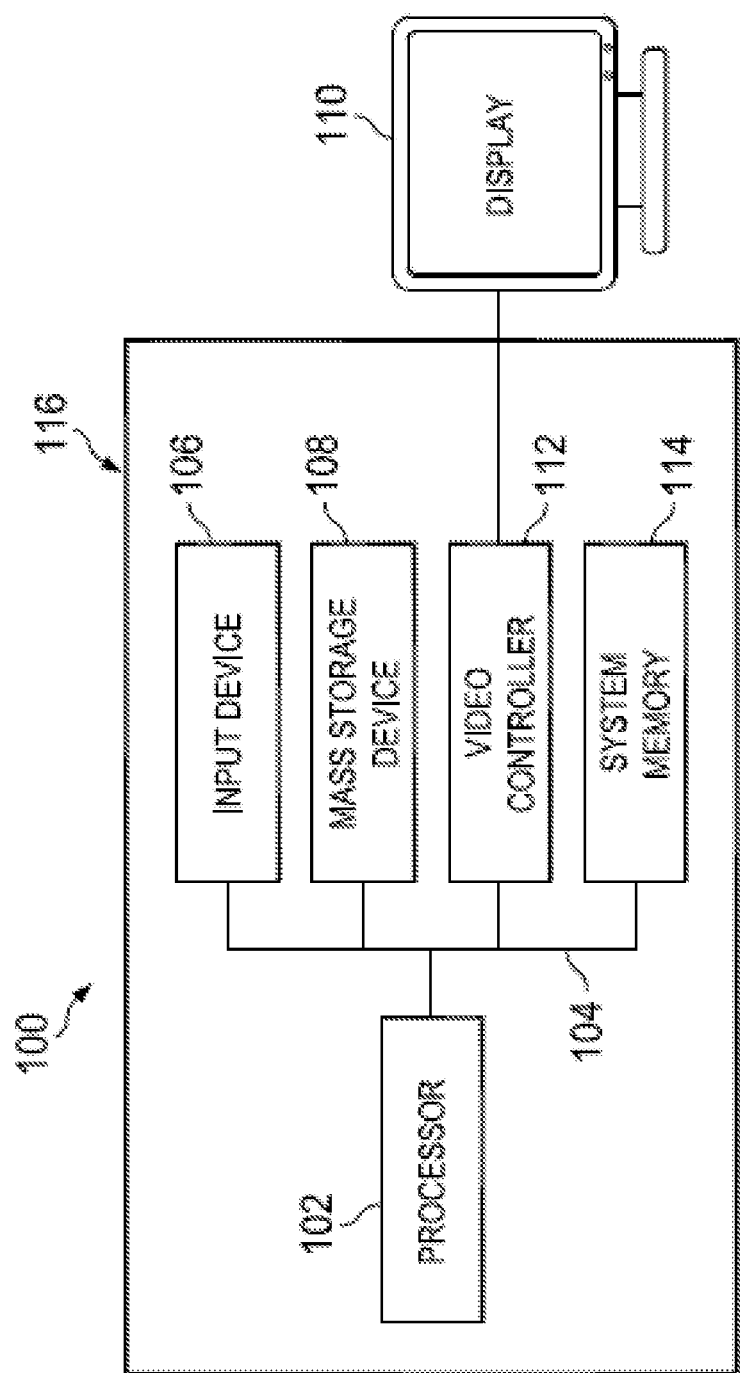
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
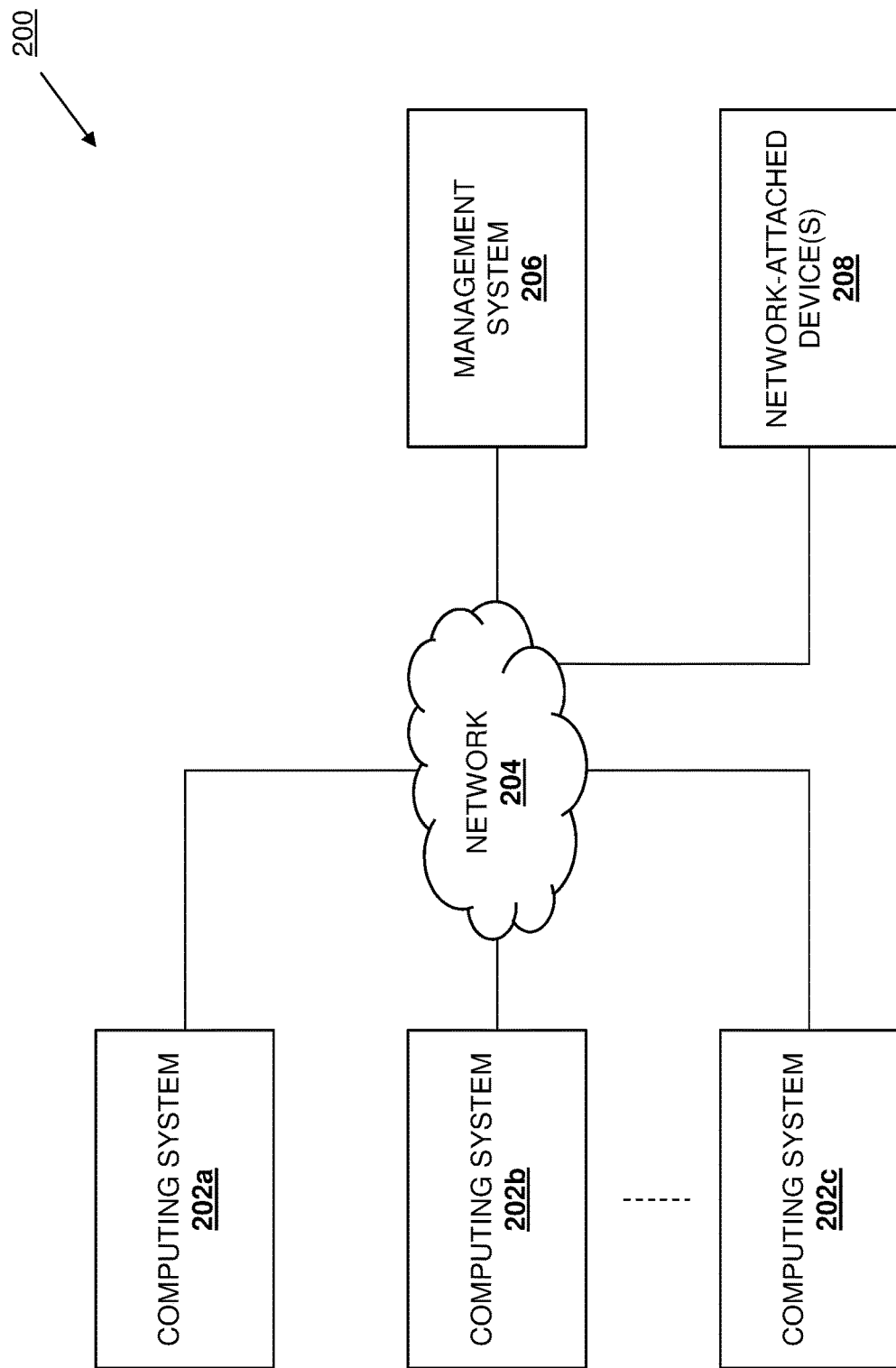
FIG. 2 is a schematic view illustrating an embodiment of a networked system.

Referring now to FIG. 2, an embodiment of a networked system 200 is illustrated in which the coordinated initialization system of the present disclosure may be utilized. In the illustrated embodiment, the networked system 200 includes a plurality of computing systems 202a, 202b, and up to 202c. In an embodiment, the computing system 202a-202c may be provided by the IHS 100 discussed above with reference to FIG. 1, and/or may include some or all of the components of the IHS 100, and in specific examples may be provided by server devices. However, while discussed as being provided by server devices, one of skill in the art in possession of the present disclosure will recognize that computing systems provided in the networked system 200 may include any computing systems that may be configured to operate similarly as the computing systems 202a-202c discussed below. In the illustrated embodiment, each of the computing systems may be coupled to a network 204 that may be provided by a Local Area Network (LAN), the Internet, combinations thereof, and/or any other networks that would be apparent to one of skill in the art in possession of the present disclosure.

In the illustrated embodiment, a management system 206 is also coupled to the network 204. In an embodiment, the management system 206 may be provided by the IHS 100 discussed above with reference to FIG. 1, and/or may include some or all of the components of the IHS 100, and in specific examples may be provided by one or more management server devices that may be configured to perform management functionality for the computing systems 202a-202c. In the illustrated embodiment, one or more network-attached devices 208 are also coupled to the network 204. In an embodiment, the network-attached device(s) 208 may be provided by a variety of different network-attached devices that are accessible to the computing systems 202a-202c via the network 204, and in specific examples may be provided by one or more Non-Volatile Memory express (NVMe) storage devices that may be configured to provide a network-attached storage system for any or all of the computing systems 202a-202c. However, while a specific networked system 200 has been illustrated and described, one of skill in the art in possession of the present disclosure will recognize that the platform root-of-trust system of the present disclosure may be utilized with a variety of components and component configurations, and/or may be provided in a variety of computing system/network configurations, while remaining within the scope of the present disclosure as well.

Figure 3:
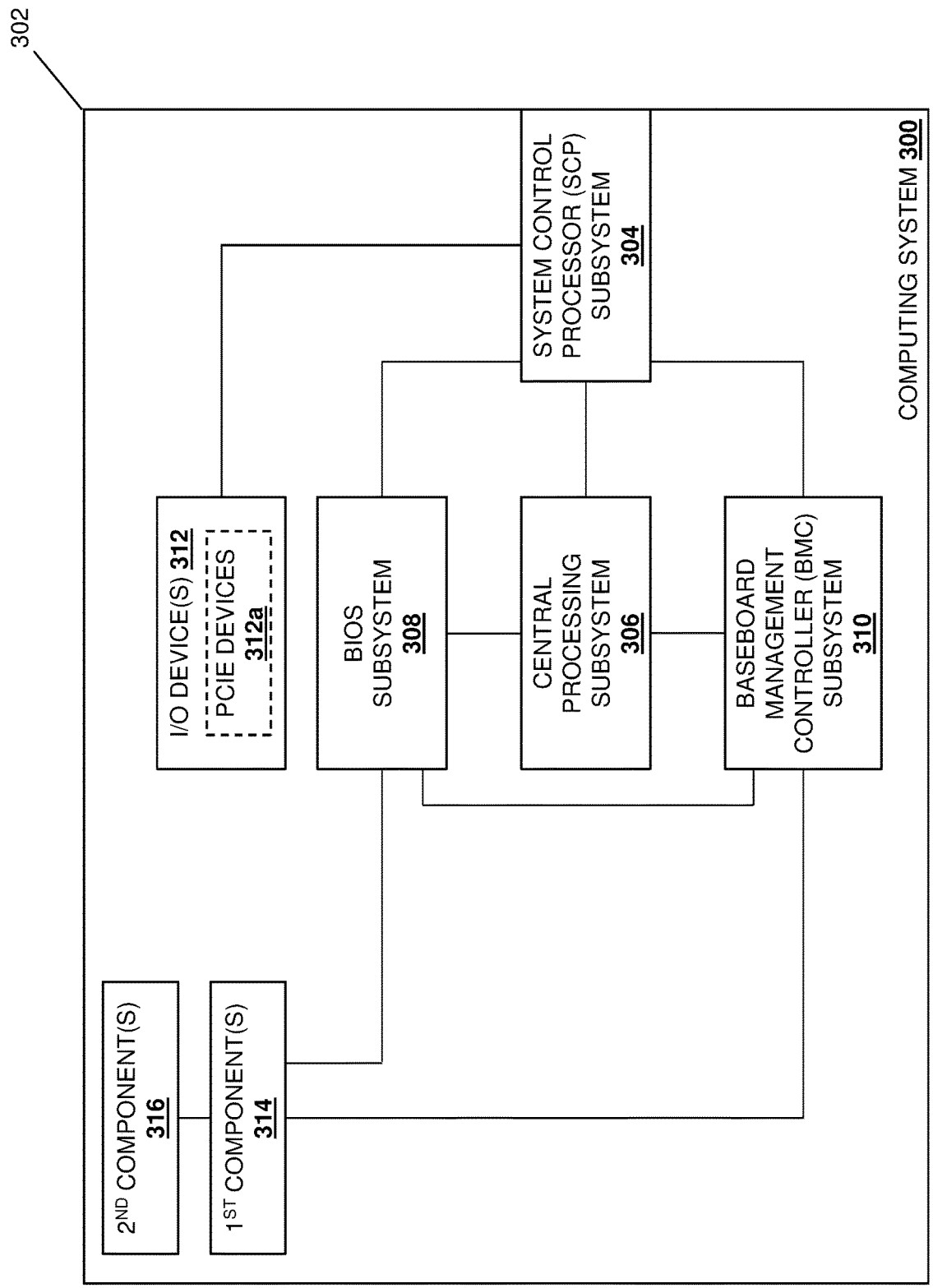
FIG. 3 is a schematic view illustrating an embodiment of a computing system that may be included in the networked system of FIG. 2 and that may utilize the coordinated initialization system of the present disclosure.

Referring now to FIG. 3, an embodiment of a computing system 300 is illustrated that may provide any or all of the computing systems 202a-202c discussed above with reference to FIG. 2. As such, the computing system 300 may be provided by the IHS 100 discussed above with reference to FIG. 1 and/or may include some or all of the components of the IHS 100, and in specific examples may be provided by a server device. However, while illustrated and discussed as being provided by a server device, one of skill in the art in possession of the present disclosure will recognize that the functionality of the computing system 300 discussed below may be provided by other computing systems that are configured to operate similarly as the computing system 300 discussed below. In the illustrated embodiment, the computing system 300 includes a chassis 302 that houses the components of the computing system 300, only some of which are illustrated below.

For example, the chassis 302 may house multiple initialization subsystems including a first initialization subsystem that, in the illustrated embodiment, is provided by a System Control Processor (SCP) subsystem 304. In some examples, the SCP subsystem 304 may be conceptualized as an "enhanced" SmartNIC device that may be configured to perform functionality that is not available in conventional SmartNIC devices such as, for example, the platform root-of-trust functionality described by the inventors of the present disclosure in U.S. patent application Ser. No. 17/027,835, filed on Sep. 22, 2020, the disclosure of which is incorporated herein by reference in its entirety. However, while this first initialization subsystem is illustrated and described as an enhanced SmartNIC device provided by an SCP subsystem, one of skill in the art in possession of the present disclosure will appreciated initialization subsystems may be provided by a variety of other subsystems that are configured to perform initialization operations similarly as discussed below while remaining within the scope of the present disclosure as well.

In an embodiment, the SCP subsystem 304 may be provided by the IHS 100 discussed above with reference to FIG. 1 and/or may include some or all of the components of the IHS 100. In specific examples, the SCP subsystem 304 may be provided as an SCP card that is configured to connect to a slot on a motherboard in the chassis 302. In other examples, the SCP subsystem 304 may be integrated into a motherboard in the chassis 302. In yet other examples the SCP subsystem 304 may be a separate/co-motherboard circuit board that is connected to a motherboard in the chassis 302 (e.g., a two-part motherboard having a first portion that enables conventional motherboard functionality, and a second portion that enables the SCP functionality discussed below). However, while a few specific examples are provided, one of skill in the art in possession of the present disclosure will appreciate that the SCP subsystem 304 may be provided in the computing system 300 in a variety of manners that will fall within the scope of the preset disclosure.

The chassis 302 may also house a central processing system 306 that is coupled to the SCP subsystem 304, and which may include the processor 102 discussed above with reference to FIG. 1, a Central Processing Unit (CPU) such as a x86 host processor, and/or by a variety of other processing components that would be apparent to one of skill in the art in possession of the present disclosure. The chassis 302 may also house another of the multiple initialization subsystems discussed above that, in the illustrated embodiment, is provided by a Basic Input/Output System (BIOS) subsystem 308 that is coupled to the SCP subsystem 304 and the central processing system 306, and that one of skill in the art in possession of the present disclosure will recognize as being provided by firmware that is configured to perform hardware initialization for the computing system 300 during a boot process (e.g., power-on startup operations) or other initialization processes known in the art, as well as runtime services for operating systems and/or other applications/programs provided by the computing system 300.

Furthermore, while described as a BIOS subsystem, one of skill in the art in possession of the present disclosure will recognize that the BIOS subsystem 308 may be replaced with a Universal Extensible Firmware Interface (UEFI) subsystem, which one of skill in the art in possession of the present disclosure will recognize defines a software interface between an operating system and firmware in the computing system 300, and that was provided to replace BIOS subsystems (while supporting legacy BIOS services). Further still, while this initialization subsystem is illustrated and described as a BIOS subsystem, one of skill in the art in possession of the present disclosure will appreciated that initialization subsystems may be provided by a variety of other subsystems that are configured to perform initialization operations similarly as discussed below while remaining within the scope of the present disclosure as well.

In the illustrated embodiment, the chassis 302 may also house a coordinated initialization subsystem that, in the illustrated embodiment, is provided by a Baseboard Management Controller (BMC) subsystem 310 that is coupled to the SCP subsystem 304 and the BIOS subsystem 308. In an embodiment, the BMC subsystem 310 may be provided by the IHS 100 discussed above with reference to FIG. 1 and/or may include some or all of the components of the IHS 100. In specific examples, the BMC subsystem 310 may be provided by an integrated DELL® Remote Access Controller (iDRAC) subsystem that may be included in server devices provided by DELL® Inc. of Round Rock, Tex., United States, although one of skill in the art in possession of the present disclosure will recognize that a variety of other BMC subsystems will fall within the scope of the present disclosure as well. One of skill in the art in possession of the present disclosure will appreciated that the BMC subsystem 310 may be configured to manage an interface between system management software in the computing system 300 and hardware in the computing system 300, as well as perform the coordinated initialization functionality discussed below. However, while the coordinated initialization subsystem is illustrated and described as a BMC subsystem, one of skill in the art in possession of the present disclosure will appreciated that the coordinated initialization subsystem maybe provided by a variety of other subsystems that are configured to perform the coordinated initialization operations similarly as discussed below while remaining within the scope of the present disclosure as well The chassis 302 may also house (or provide a coupling for) one or more Input/Output (I/O) devices 312 that are coupled to the SCP subsystem 304. As such, one of skill in the art in possession of the present disclosure will recognize that the I/O device(s) 312 may be housed in the chassis 302 and connected to an internal connector (e.g., on a motherboard in the chassis 302), or may be provided external to the chassis 302 and connected to an external connector (e.g., on an outer surface the chassis 302). As illustrated in FIG. 3, the I/O device(s) 312 may include one or more Peripheral Component Interconnect express (PCIe) devices 312a (as the I/O device(s) 312 or in addition to other I/O device(s)). For example, the PCIe device(s) 312a may include NVMe storage devices that are house in the chassis 302 (i.e., and connected to an internal connector on a motherboard in the chassis 302), or that are external to the chassis 302 (i.e., and connected to an external connector on an outer surface of the chassis 302). However, while particular I/O devices and/or PCI devices have been described, one of skill in the art in possession of the present disclosure will recognize that a variety of other I/O devices will fall within the scope of the present disclosure as well.

The chassis 302 may also house one or more first components 314 that are coupled to each of the BIOS subsystem 308 and the BMC subsystem 310, and one or more second components 316 that are coupled to at least one of the first components 314. In the specific examples provided below, the first component(s) 314 may include a Complex Programmable Logic Device (CPLD) and a power system, while the second component(s) 316 may include a display device (e.g., a Liquid Crystal Display (LCD) provided on a server device chassis), fan devices, and a PCIe switch device. However, one of skill in the art in possession of the present disclosure will recognize that the first component(s) 314 and the second component(s) 316 may include any of a variety of computing system components known in the art. While a specific computing system 300 has been illustrated, one of skill in the art in possession of the present disclosure will recognize that computing systems (or other devices operating according to the teachings of the present disclosure in a manner similar to that described below for the computing system 300) may include a variety of components and/or component configurations for providing conventional computing system functionality, as well as the functionality discussed below, while remaining within the scope of the present disclosure as well.

Figure 4:
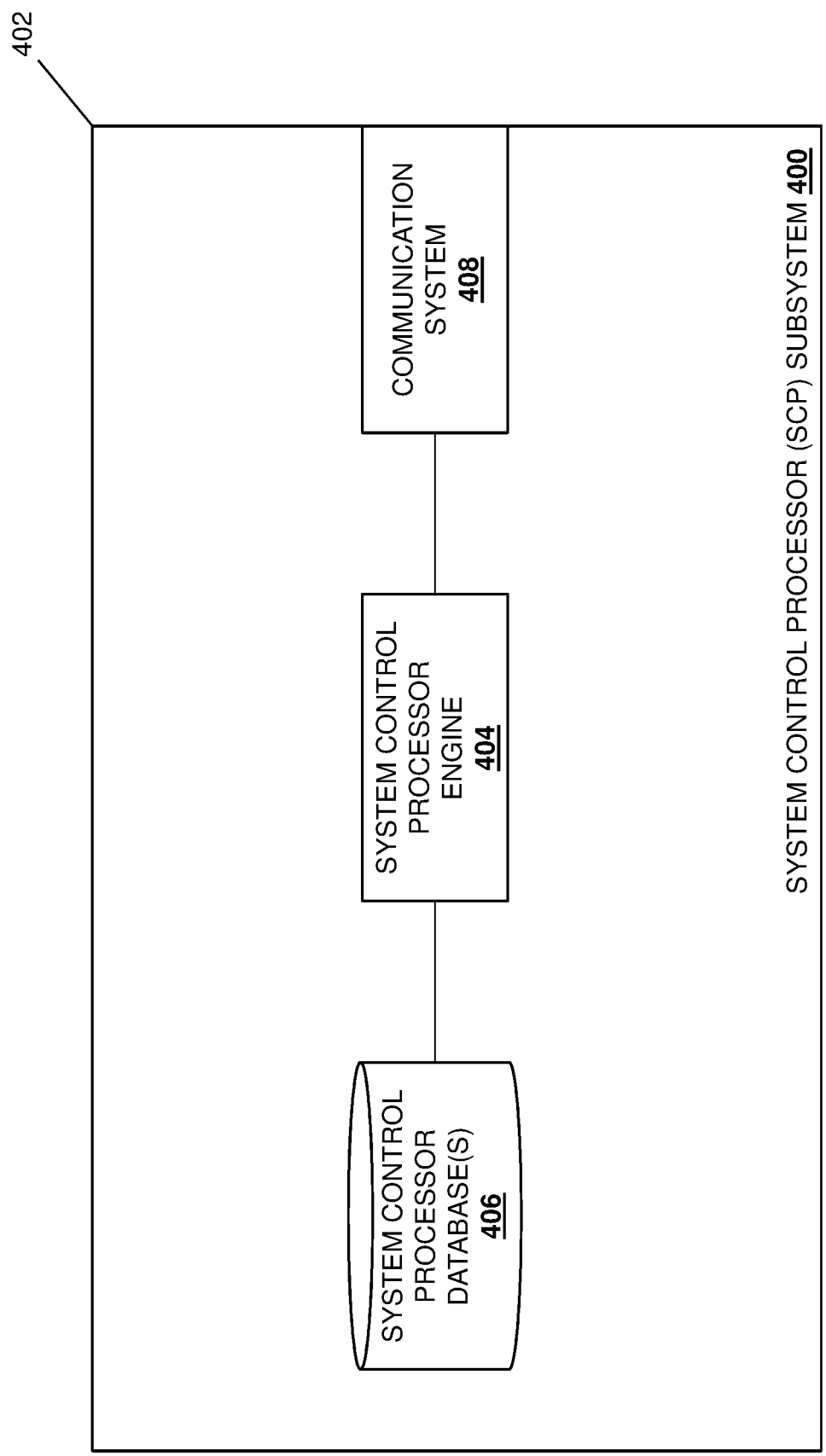
FIG. 4 is a schematic view illustrating an embodiment of a System Control Processor (SCP) subsystem that may be included in the computing device of FIG. 3.

Referring now to FIG. 4, an embodiment of an SCP subsystem 400 is illustrated that may provide the SCP subsystem 304 discussed above with reference to FIG. 3. As such, the SCP subsystem 400 may be provided by the IHS 100 discussed above with reference to FIG. 1 and/or may include some or all of the components of the IHS 100, and in specific examples may be provided as an SCP card, may be integrated into a motherboard, or may be provided as a separate/co-motherboard circuit board. However, while illustrated and discussed as being provided in different manners in a computing system 400, one of skill in the art in possession of the present disclosure will recognize that the functionality of the SCP subsystem 400 discussed below may be provided by other devices that are configured to operate similarly as the SCP subsystem 400 discussed below. In the illustrated embodiment, the SCP subsystem 400 includes a chassis 402 (e.g., a circuit board) that supports the components of the SCP subsystem 400, only some of which are illustrated below. For example, the chassis 402 may support an SCP processing system including one or more SCP processors (not illustrated, but which may include the processor 102 discussed above with reference to FIG. 1) and an SCP memory system (not illustrated, but which may include the memory 114 discussed above with reference to FIG. 1) that is coupled to the SCP processing system and that includes instructions that, when executed by the SCP processing system, cause the SCP processing system to provide an SCP engine 404 that is configured to perform the functionality of the SCP engines and/or SCP subsystems discussed below.

The chassis 402 may also support a storage system (not illustrated, but which may include the storage 108 discussed above with reference to FIG. 1, the SCP memory system discussed above, etc.) that is coupled to the SCP engine 404 (e.g., via a coupling between the storage system and the SCP processor) and that may include one or more SCP databases 406 that are configured to store any of the information utilized by the SCP engine 404 discussed below. The chassis 402 may also support a communication system 408 that is coupled to the SCP engine 404 (e.g., via a coupling between the communication system 408 and the SCP processor) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. As such, the communication system 408 may include any of the connections discussed below between the SCP subsystem 400 and the network 204, the central processing subsystem 306, the BIOS subsystem 308, the BMC subsystem 310, the I/O device(s) 312, and/or any other components utilized with the computing system 202a/300. However, while a specific SCP subsystem 400 has been illustrated and described, one of skill in the art in possession of the present disclosure will recognize that SCP subsystems (or other devices operating according to the teachings of the present disclosure in a manner similar to that described below for the SCP subsystem 400) may include a variety of components and/or component configurations for providing the functionality discussed below while remaining within the scope of the present disclosure as well.

Figure 5:
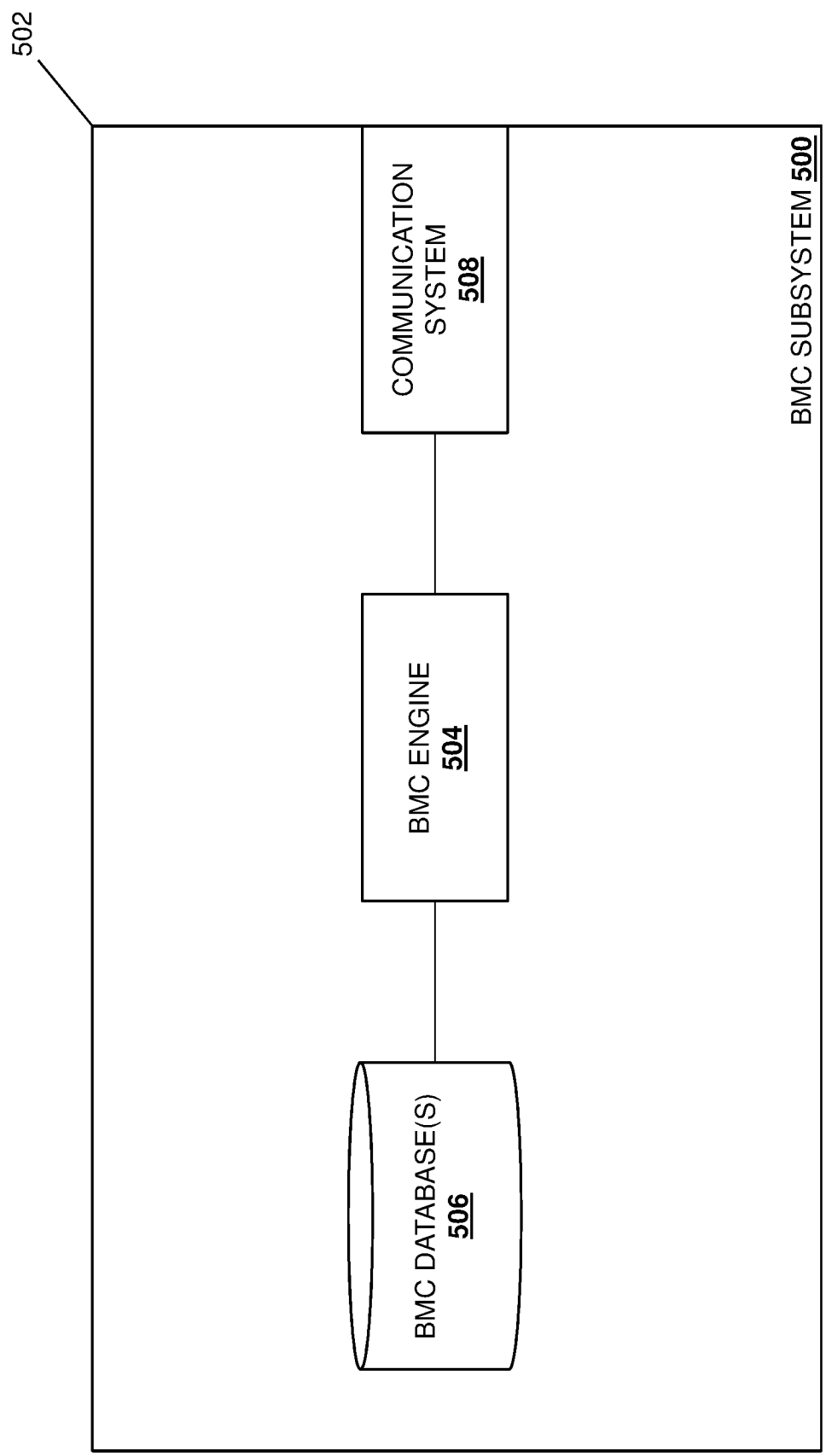
FIG. 5 is a schematic view illustrating an embodiment of a Baseboard Management Controller (BMC) subsystem that may be included in the computing device of FIG. 3.

Referring now to FIG. 5, an embodiment of a BMC subsystem 500 is illustrated that may provide the BMC subsystem 310 discussed above with reference to FIG. 3. As such, the BMC subsystem 500 may be provided by the IHS 100 discussed above with reference to FIG. 1 and/or may include some or all of the components of the IHS 100, and in specific examples may be provided as an iDRAC® subsystem and/or other BMC subsystems that would be apparent to one of skill in the art in possession of the present disclosure. However, while illustrated and discussed as being provided by a BMC subsystem, one of skill in the art in possession of the present disclosure will recognize that the functionality of the BMC subsystem 500 discussed below may be provided by other devices that are configured to operate similarly as the BMC subsystem 500 discussed below. In the illustrated embodiment, the BMC subsystem 500 includes a chassis 502 (e.g., a circuit board) that supports the components of the BMC subsystem 500, only some of which are illustrated below. For example, the chassis 502 may support a BMC processing system including one or more BMC processors (not illustrated, but which may include the processor 102 discussed above with reference to FIG. 1) and a BMC memory system (not illustrated, but which may include the memory 114 discussed above with reference to FIG. 1) that is coupled to the BMC processing system and that includes instructions that, when executed by the BMC processing system, cause the BMC processing system to provide a BMC engine 504 that is configured to perform the functionality of the BMC engines and/or BMC subsystems discussed below.

The chassis 502 may also support a storage system (not illustrated, but which may include the storage 108 discussed above with reference to FIG. 1, the SCP memory system discussed above, etc.) that is coupled to the BMC engine 504 (e.g., via a coupling between the storage system and the SCP processor) and that may include one or more BMC databases 506 that are configured to store any of the information utilized by the BMC engine 504 discussed below. The chassis 502 may also support a communication system 508 that is coupled to the BMC engine 504 (e.g., via a coupling between the communication system 508 and the BMC processor) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. As such, the communication system 508 may include any of the connections between the BMC subsystem 500 and the network 204, the SCP subsystem 304, the BIOS subsystem 308, and/or any other components in the computing system 300. However, while a specific BMC subsystem 500 has been illustrated and described, one of skill in the art in possession of the present disclosure will recognize that BMC subsystems (or other devices operating according to the teachings of the present disclosure in a manner similar to that described below for the BMC subsystem 500) may include a variety of components and/or component configurations for providing the functionality discussed below while remaining within the scope of the present disclosure as well.

Referring now to FIG. 6, an embodiment of a method 600 for coordinating initialization of multiple subsystems in a computing system is illustrated. As discussed below, the systems and methods of the present disclosure provide for the initialization of multiple initialization subsystems in a computing system in a coordinated manner such that any first initialization operations that are performed by one initialization subsystem and that are dependent on any second initialization operations performed by another initialization subsystem may be paused until those second initialization operations are completed to allow parallel initialization of initialization subsystems with dependent initialization operations. For example, the coordinated initialization system of the present disclosure may include a computing system with first and second initialization subsystems coupled to a coordinated initialization subsystem. The coordinated initialization subsystem receives first and second initialization progress information associated with respective first and second initialization subsystem operations performed by the respective first and second initialization subsystems. Using a coordinated initialization database that identifies dependences between the first and second initialization operations, the coordinated initialization subsystem determines that the first initialization progress information identifies a first initialization operation that is going to be performed by the first initialization subsystem and that is dependent on a second initialization operation that is identified by the second initialization progress information and that has not yet been performed by the second initialization subsystem and, in response, causes the first initialization subsystem to pause the first initialization subsystem operations until the second initialization operation has been performed. As such, the initialization time for a computing system with multiple initialization subsystems may be reduced relative to conventional computing systems with multiple initialization subsystems.

The method 600 begins at block 602 where a coordinated initialization subsystem receives first initialization progress information from a first initialization subsystem. In an embodiment, at or prior to block 602, an initialization command may be provided to the computing system 202a/300 to begin initialization of the computing system 202a/300. For example, a user of the computing system 202a/300 may provide a power on command (e.g., via the actuation of a power button the computing system 202a/300, via a remote power on command, etc.), a reset command, a reboot command, and/or other initialization command that one of skill in the art in possession of the present disclosure would recognize as beginning an initialization process for the computing system. In the examples discussed below, the initialization command provided to the computing system 202a/300 is configured to cause the SCP subsystem 304 to begin SCP subsystem initialization operations in order to configure the SCP subsystem to perform SCP subsystem runtime operations, and to cause the BIOS subsystem 308 to begin BIOS subsystem initialization operations to in order to configure the computing system 202a/300 to perform computing system runtime operations. However, while two specific initialization subsystems are described below, one of skill in the art in possession of the present disclosure will appreciate that any number of multiple initialization subsystems may begin initialization operations in response to an initialization command being provided to the computing system 202a/300 while remaining within the scope of the present disclosure as well.

Figure 7A:
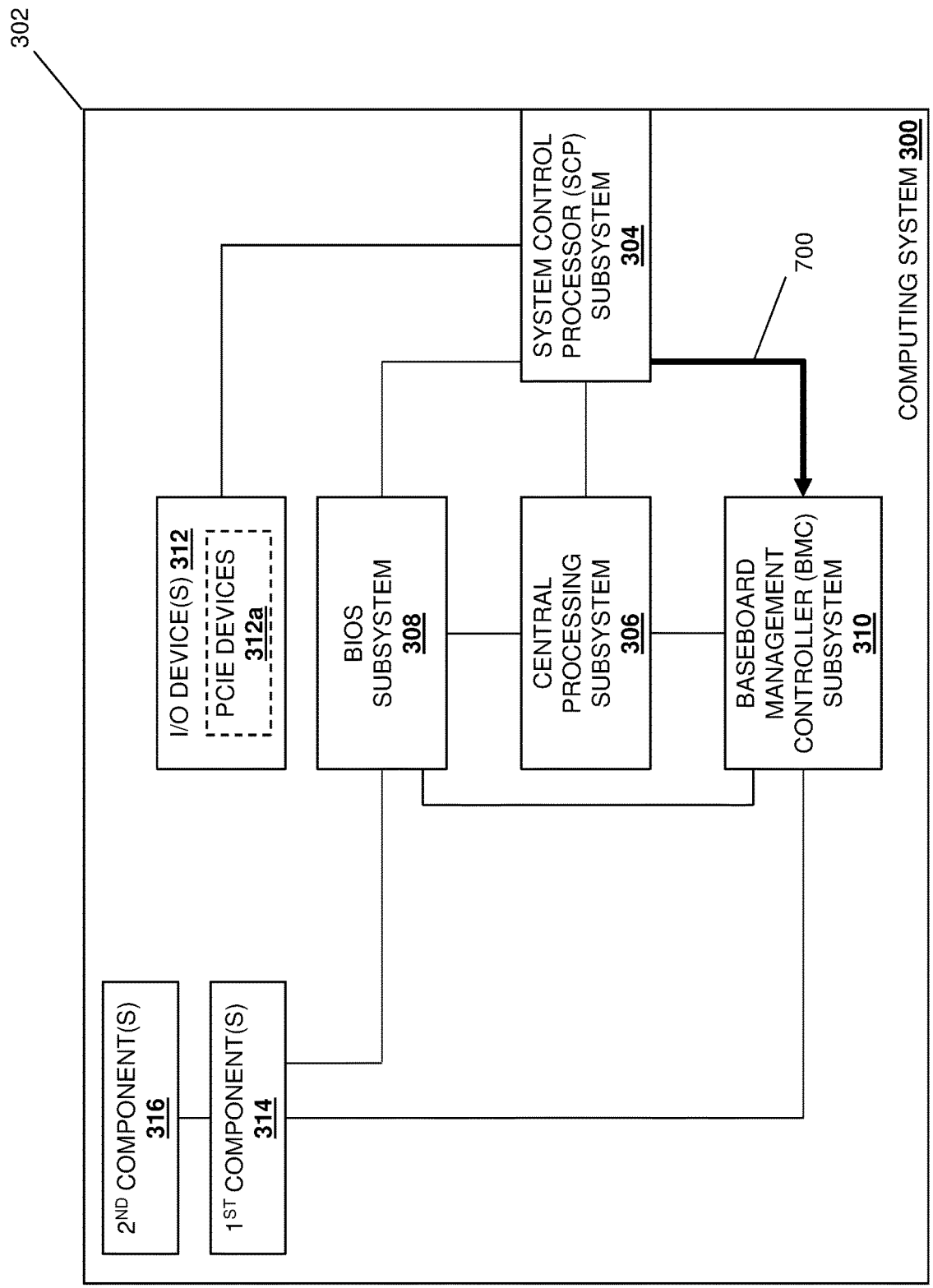
FIG. 7A is a schematic view illustrating an embodiment of the computing system of FIG. 3 operating during the method of FIG. 6.

As such, in an embodiment of block 602, the SCP engine 404 in the SCP subsystem 304/400 may perform the SCP subsystem initialization operations that are described in further detail herein and which may include, for example, mapping remote boot devices to the BIOS subsystem 308, mapping other remote devices (e.g., a Graphics Processing Unit (GPU)) to a PCIe bus in the computing system such that they appear as local devices that may be detected by the BIOS subsystem 308 in a PCIe scan, and/or a variety of other SCP subsystem initialization operations that would be apparent to one of skill in the art in possession of the present disclosure. With reference to FIG. 7A, the SCP engine 404 in the SCP subsystem 304/400 may be configured to perform SCP subsystem initialization progress reporting operations 700 that may include generating and transmitted SCP subsystem initialization progress information associated with the SCP subsystem initialization operations performed by the SCP subsystem 304/400 via its communication system 408 to the BMC subsystem 310.

In an embodiment, the SCP subsystem initialization progress information transmitted by the SCP subsystem 304/400 at block 602 may identify SCP subsystem initialization operations that have been completed by the SCP subsystem 304/400. As such, the SCP engine 404 in the SCP subsystem 304/400 may be configured to perform the SCP subsystem initialization progress reporting operations 700 and transmit SCP subsystem initialization progress information each time a particular SCP subsystem initialization operation has been completed. In a specific example, the SCP subsystem initialization operations may include a plurality of SCP subsystem boot operations, and the SCP database 406 may store a corresponding SCP subsystem boot operation progress code in association with each of those SCP subsystem boot operations, with each SCP subsystem boot operation progress code configured to identify its associated SCP subsystem boot operation as discussed in further detail below.

As such, the SCP engine 404 in the SCP subsystem 304/400 may complete the mapping of remote boot devices to the BIOS subsystem 308 and, in response, identify the SCP subsystem boot operation progress code for the remote boot device mapping in the SCP database 406 and transmit that SCP subsystem boot operation progress code to the BMC subsystem 310 as part of the SCP subsystem initialization progress reporting operations 700. Similarly, the SCP engine 404 in the SCP subsystem 204/400 may complete the mapping other remote devices (e.g., a Graphics Processing Unit (GPU)) to a PCIe bus in the computing system such that they appear as local devices that may be detected by the BIOS subsystem 308 in a PCIe scan and, in response, identify the SCP subsystem boot operation progress code for the remote device/PCIe bus mapping in the SCP database 406 and transmit that SCP subsystem boot operation progress code to the BMC subsystem 310 as part of the SCP subsystem initialization progress reporting operations 700. Thus, one of skill in the art in possession of the present disclosure will appreciate that block 602 may be performed throughout the initialization process for the SCP subsystem 304 to periodically transmit SCP subsystem initialization progress information when particular SCP subsystem initialization operations are completed.

Figure 7B:
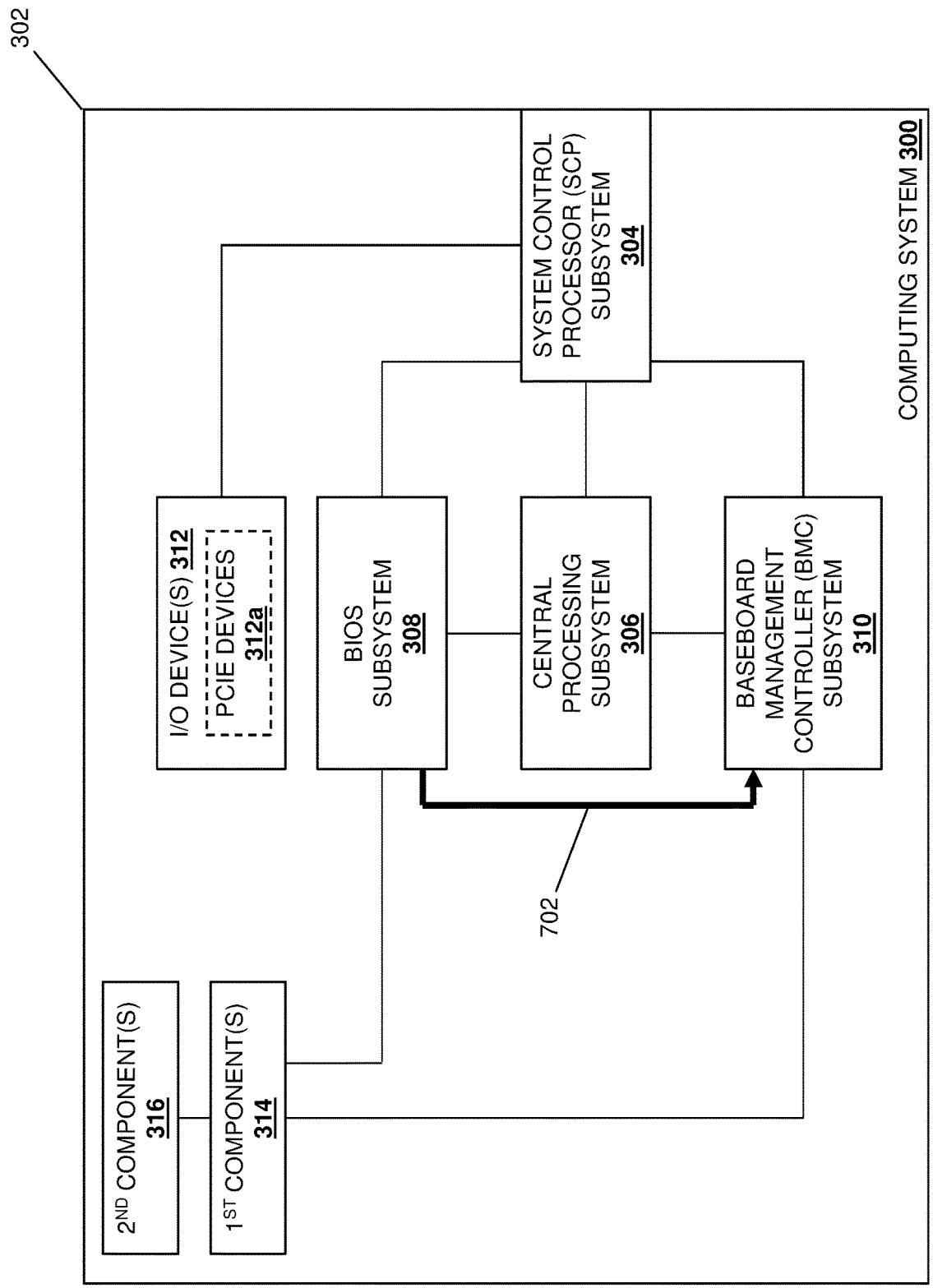
FIG. 7B is a schematic view illustrating an embodiment of the computing system of FIG. 3 operating during the method of FIG. 6.

The method 600 then proceeds to block 604 where the coordinated initialization subsystem receives second initialization progress information from a second initialization subsystem. In an embodiment, at block 604, the BIOS subsystem 308 may perform BIOS subsystem initialization operations which may include the BIOS operations discussed below with reference to FIG. 7E, and/or a variety of BIOS initialization operations that one of skill in the art in possession of the present disclosure would recognize provide for the initialization of the computing system 202a/300, at least one of which may be dependent on the completion of SCP subsystem initialization operations being performed by the SCP subsystem 304/400. With reference to FIG. 7B, the BIOS subsystem 308 may be configured to perform BIOS subsystem initialization progress reporting operations 702 that may include generating and transmitted BIOS subsystem initialization progress information associated with the BIOS subsystem initialization operations performed by the BIOS subsystem 308 to the BMC subsystem 310.

In an embodiment, the BIOS subsystem initialization progress information transmitted by the BIOS subsystem 308 at block 604 may identify BIOS subsystem initialization operations that are about to be performed by the BIOS subsystem 308. As such, the BIOS subsystem 308 may be configured to perform the BIOS subsystem initialization progress reporting operations 702 and transmit BIOS subsystem initialization progress information each time the BIOS subsystem is ready to perform a particular BIOS subsystem initialization operation. In a specific example, the BIOS subsystem initialization operations may include a plurality of BIOS subsystem boot operations, and the BIOS subsystem 308 may store a corresponding BIOS subsystem boot operation progress code in association with each of those BIOS subsystem boot operations, with each BIOS subsystem boot operation progress code configured to identify its associated BIOS subsystem boot operation as discussed in further detail below. As such, the BIOS subsystem 308 may complete any BIOS subsystem initialization operations and, in response, identify the BIOS subsystem boot operation progress code for that BIOS subsystem initialization operation and transmit that BIOS subsystem boot operation progress code to the BMC subsystem 310 as part of the BIOS subsystem initialization progress reporting operations 702. Thus, one of skill in the art in possession of the present disclosure will appreciate that block 604 may be performed throughout the initialization process for the BIOS subsystem 308 to periodically transmit BIOS subsystem initialization progress information when the BIOS subsystem 308 is ready to perform any particular BIOS subsystem initialization operation.

With reference to FIG. 7C, at blocks 602 and 604, the BMC engine 504 in the BMC subsystem 310 may perform initialization progress receiving operations 704 in order to receive the SCP subsystem initialization progress information transmitted by the SCP subsystem 304 according to block 602, and receive the BIOS subsystem initialization progress information transmitted by the BIOS subsystem 308 according to block 604. As such, one of skill in the art in possession of the present disclosure will recognize that blocks 602 and 604 may be performed simultaneously as the SCP subsystem 304 and the BIOS subsystem 308 perform their respective initialization operations in parallel such that the BMC subsystem 310 receives initialization progress information (e.g., the SCP boot progress codes and the BIOS boot process codes discussed in the specific examples provided above) as those respective initialization operations progress. Furthermore, while only two initializations subsystems are described herein for ease of discussion, one of skill in the art in possession of the present disclosure will appreciate that additional initialization subsystems may be initialized in parallel as described herein while remaining within the scope of the present disclosure as well.

Figure 7D:
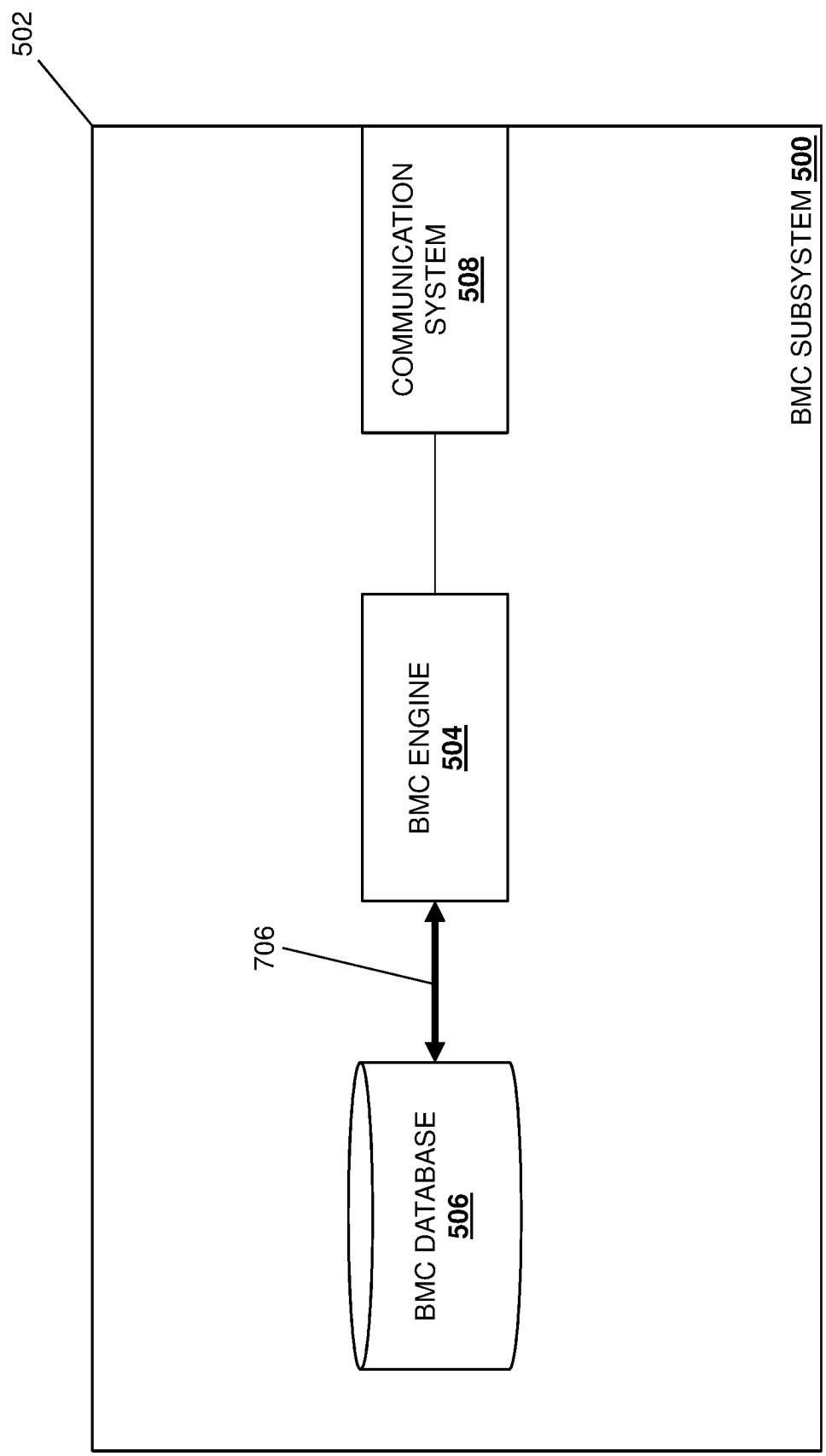
FIG. 7D is a schematic view illustrating an embodiment of the BMC subsystem of FIG. 5 operating during the method of FIG. 6.

The method 600 then proceeds to decision block 606 where it is determined whether a first initialization operation depends on an uncompleted second initialization operation. In an embodiment, at decision block 606, a coordination initialization subsystem may operate to determine whether a first initialization operation that one of the initialization subsystems in the computing system 202a/300 is ready to perform is dependent on a second initialization operation that has not been completed by another of the initialization subsystems. For example, with reference to FIG. 7D, the BMC engine 504 in the BMC subsystem 310/500 may perform initialization operation dependency determination operations 706 to access the BMC database 506 to determine whether a BIOS subsystem initialization operation that the BIOS subsystem 308 reported it was about to perform at block 602 depends on an SCP subsystem initialization operation that the SCP subsystem 304 has not yet reported it has completed yet.

Figure 7E:
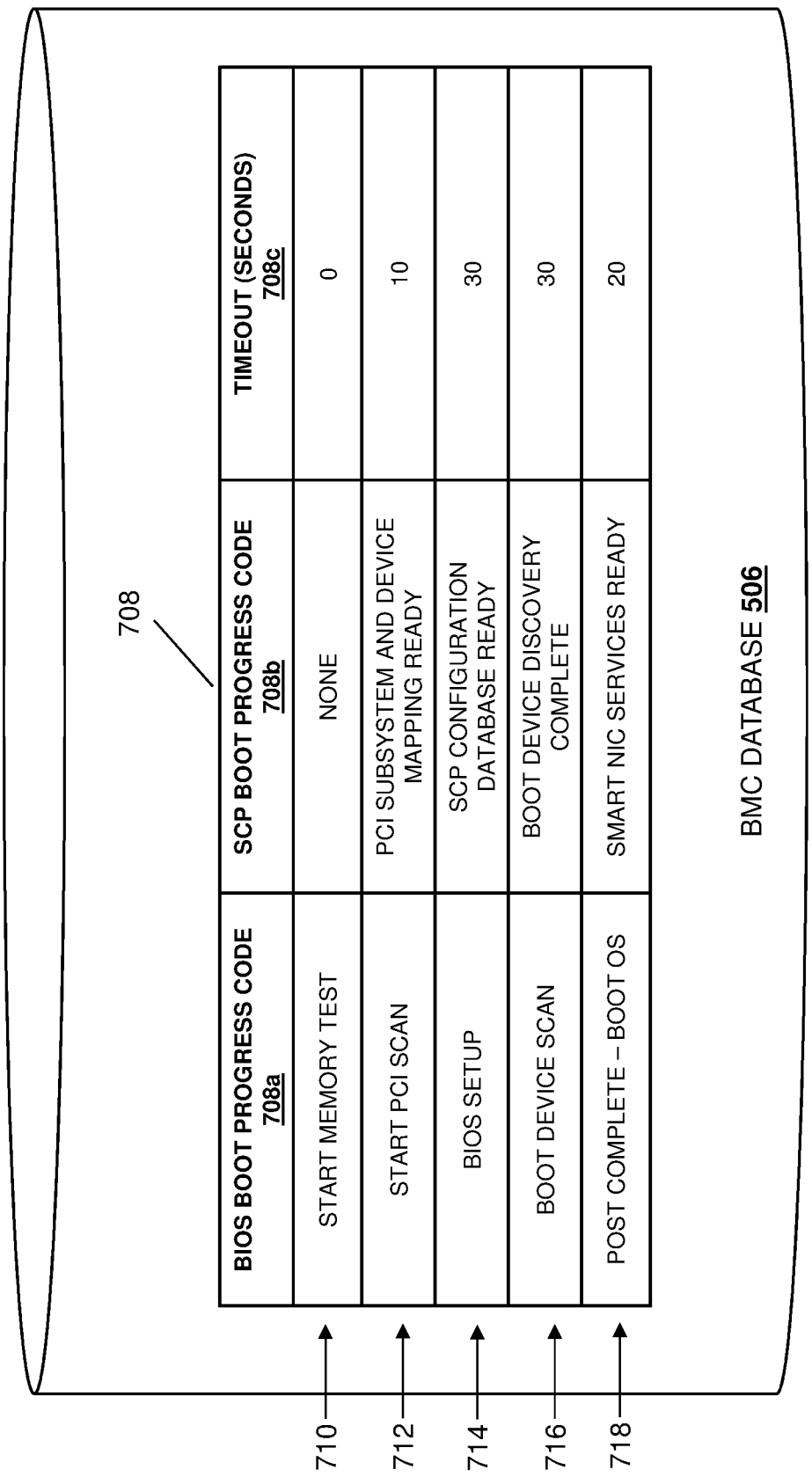
FIG. 7E is a schematic view illustrating an embodiment of a BMC database that may be included in the computing system of FIG. 3 during the method of FIG. 6.

For example, with reference to FIG. 7E, the BMC database 506 may include an initialization operation dependency table 708 that, in the illustrated example that uses the specific examples provided above, includes a BIOS boot progress code column 708a, an SCP boot progress code column 708b, and a timeout column 708c. As will be appreciated by one of skill in the art in possession of the present disclosure, each row of the initialization operation dependency table 708 may identify a BIOS subsystem boot operation that is identifiable by a BIOS boot progress code in the BIOS boot progress code column 708a, an SCP subsystem boot operation that is identifiable by an SCP boot progress code and upon which the BIOS subsystem boot operation in that row depends (if any dependency exists) in the SCP boot progress code column 708b, and a timeout amount associated with pausing the BIOS subsystem boot operation in that row until the completion of the SCP subsystem boot operation in that row in the timeout column 708c (discussed in further detail below).

Thus, in the specific example illustrated in FIG. 7E, a row 710 in the initialization operation dependency table 708 includes a "start memory test" BIOS subsystem boot operation that is identifiable by a BIOS boot progress code in the BIOS boot progress code column 708a, with the "start memory test" BIOS subsystem boot operation not dependent on the completion of any SCP subsystem boot operation that is identifiable by an SCP subsystem progress code (as indicated by the "none" in the SCP boot progress code column 708b), and thus having no timeout amount in the timeout column 708c associated with the pausing of the "start memory test" BIOS subsystem boot operation (as indicated by the "0" timeout amount in the timeout column 708c). Similarly, a row 712 in the initialization operation dependency table 708 includes a "start PCI scan" BIOS subsystem boot operation that is identifiable by a BIOS boot progress code in the BIOS boot progress code column 708a, with the "start PCI scan" BIOS subsystem boot operation dependent on the completion of a "PCI subsystem and device mapping ready" SCP subsystem boot operation that is identifiable by an SCP subsystem progress code in the SCP boot progress code column 708b, and having a 10 second timeout amount in the timeout column 708c associated with the pausing of the "start PCI scan" BIOS subsystem boot operation until the completion of the "PCI subsystem and device mapping ready" SCP subsystem boot operation.

Similarly as well, a row 714 in the initialization operation dependency table 708 includes a "BIOS setup" BIOS subsystem boot operation that is identifiable by a BIOS boot progress code in the BIOS boot progress code column 708a, with the "BIOS setup" BIOS subsystem boot operation dependent on the completion of an "SCP configuration database ready" SCP subsystem boot operation that is identifiable by an SCP subsystem progress code in the SCP boot progress code column 708*b*, and having a 30 second timeout amount in the timeout column 708*c* associated with the pausing of the "BIOS setup" BIOS subsystem boot operation until the completion of the "SCP configuration database ready" SCP subsystem boot operation. Similarly as well, a row 716 in the initialization operation dependency table 708 includes a "boot device scan" BIOS subsystem boot operation that is identifiable by a BIOS boot progress code in the BIOS boot progress code column 708*a*, with the "boot device scan" BIOS subsystem boot operation dependent on the completion of a "boot device discovery complete" SCP subsystem boot operation that is identifiable by an SCP subsystem progress code in the SCP boot progress code column 708*b*, and having a 30 second timeout amount in the timeout column 708*c* associated with the pausing of the "boot device scan" BIOS subsystem boot operation until the completion of the "boot device discovery complete" SCP subsystem boot operation.

Similarly as well, a row 718 in the initialization operation dependency table 708 includes a "post complete—boot Operating System (OS)" BIOS subsystem boot operation that is identifiable by a BIOS boot progress code in the BIOS boot progress code column 708*a*, with the "post complete—boot Operating System (OS)" BIOS subsystem boot operation dependent on the completion of a "Smart NIC services ready" SCP subsystem boot operation that is identifiable by an SCP subsystem progress code in the SCP boot progress code column 708*b*, and having a 20 second timeout amount in the timeout column 708*c* associated with the pausing of the "post complete—boot Operating System (OS)" BIOS subsystem boot operation until the completion of the "Smart NIC services ready" SCP subsystem boot operation. However, while several specific dependencies for two initialization subsystems are provided as an example above, one of skill in the art in possession of the present disclosure will appreciate how the BMC database 506 may include one or more initialization operation dependency tables that identify the dependencies between any number of initialization operations performed by any number of initialization subsystems while remaining within the scope of the present disclosure as well. Furthermore, one of skill in the art in possession of the present disclosure will appreciate that different SCP subsystems, and/or SCP subsystems with different functionality/"personalities", may have different dependencies with the BIOS subsystem 308, and that the initialization operation dependency table(s) may be configured to address those different dependencies as well.

If, at decision block 606, it is determined that the first initialization operation does not depend on a second initialization operation, the method 600 returns to block 602. For example, with reference to the example of the initialization operation dependency table 708 in the BMC database 506 discussed above, at decision block 606 the BMC engine 504 may determine that a BIOS boot progress code received from the BIOS subsystem 308 at block 602 identifies the "start memory test" BIOS subsystem boot operation that is not dependent on any SCP subsystem boot operations, or identifies the "start PCI scan" BIOS subsystem boot operation and that an SCP boot progress code for the dependent "PCI subsystem and device mapping ready" SCP subsystem boot operation has already been received from the SCP subsystem 304 at block 604, or identifies the "BIOS setup" BIOS subsystem boot operation and that an SCP boot progress code for the dependent "SCP configuration database ready" SCP subsystem boot operation has already been received from the SCP subsystem 304 at block 604, or identifies the "boot device scan" BIOS subsystem boot operation and that an SCP boot progress code for the dependent "boot device discovery complete" SCP subsystem boot operation has already been received from the SCP subsystem 304 at block 604, or identifies the "post complete—boot Operating System (OS)" BIOS subsystem boot operation and that an SCP boot progress code for the dependent "smart NIC services ready" SCP subsystem boot operation has already been received from the SCP subsystem 304 at block 604.

As such, the method 600 may loop through blocks 602, 604, and 606 such that the SCP subsystem 304 and the BIOS subsystem 308 perform their respective initialization operations and report their respective initialization operation progress to the BMC subsystem 310 as long as the BIOS subsystem 308 does not report that it is about to perform a BIOS subsystem initialization operation that is dependent on an SCP subsystem initialization operation that the SCP subsystem 304 has not yet reported that it has completed. Thus, one of skill in the art in possession of the present disclosure will appreciate that, in the specific example provided herein, as long as the SCP subsystem 304 performs its SCP subsystem initialization operations "faster" than the BIOS subsystem 308, each of the SCP subsystem 304 and BIOS subsystem 308 may proceed with their respective initialization operations in parallel and without the initialization operation pausing operations discussed below. Furthermore, in some examples, the BMC subsystem 310 may simply allow the BIOS subsystem initialization operations to proceed as long as the BIOS subsystem 308 does not report that it is about to perform a BIOS subsystem initialization operation that is dependent on an SCP subsystem initialization operation that the SCP subsystem 304 has not yet reported that it has completed. However, in other examples, the BMC subsystem 310 may affirmatively report to the BIOS subsystem 308 that it may proceed with any BIOS subsystem initialization operation that is dependent on a corresponding SCP subsystem initialization operation whenever the SCP subsystem 304 reports that it has completed that SCP subsystem initialization operation.

Figure 7F:
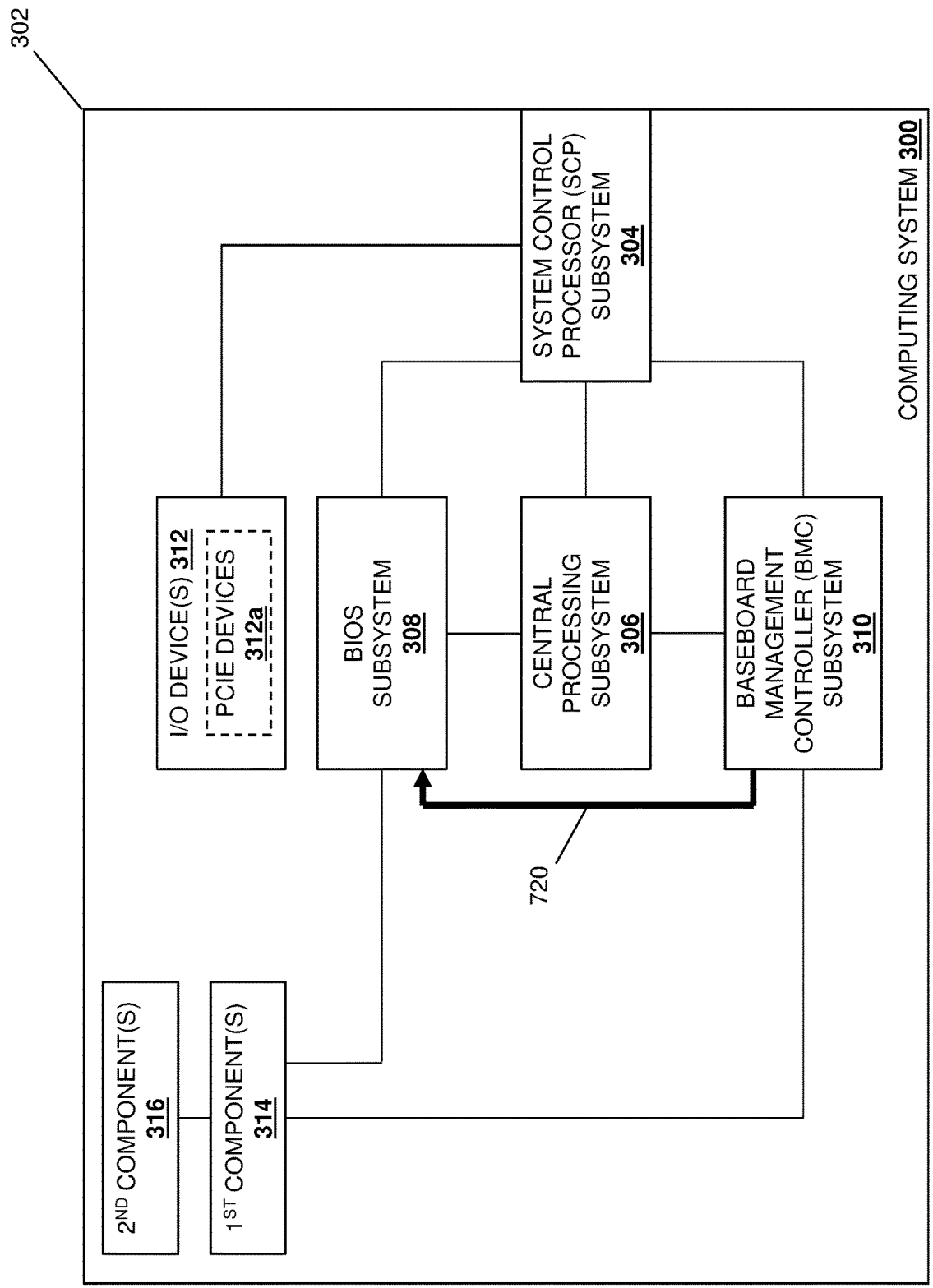
FIG. 7F is a schematic view illustrating an embodiment of the computing system of FIG. 3 operating during the method of FIG. 6.

If, at decision block 606, it is determined that the first initialization operation depends on a second initialization operation, the method 600 may proceed to block 608 where the coordinated initialization subsystem sends an initialization pause communication to the first initialization subsystem. With reference to FIG. 7F, in an embodiment of block 608 and in response to determining that the BIOS subsystem initialization operation progress information received from the BIOS subsystem 308 at block 604 indicates that the BIOS subsystem 308 is about to perform a BIOS subsystem initialization operation that is dependent on an SCP subsystem initialization operation for which SCP subsystem initialization operation progress information has not yet been received from the SCP subsystem 304 at block 602, the BMC engine 504 in the BMC subsystem 310/500 may perform BIOS subsystem initialization pause communication transmission operations 720 to generate and transmit a BIOS subsystem initialization pause communication to the BIOS subsystem 308.

For example, with reference to the example of the initialization operation dependency table 708 in the BMC database 506 discussed above, at decision block 606 the BMC engine 504 may determine that a BIOS boot progress code received from the BIOS subsystem 308 at block 602 identifies the "start PCI scan" BIOS subsystem boot operation and that an SCP boot progress code for the dependent "PCI subsystem and device mapping ready" SCP subsystem boot operation has not yet received from the SCP subsystem 304 at block 604, or identifies the "BIOS setup" BIOS subsystem boot operation and that an SCP boot progress code for the dependent "SCP configuration database ready" SCP subsystem boot operation has not yet been received from the SCP subsystem 304 at block 604, or identifies the "boot device scan" BIOS subsystem boot operation and that an SCP boot progress code for the dependent "boot device discovery complete" SCP subsystem boot operation has not yet been received from the SCP subsystem 304 at block 604, or identifies the "post complete-boot Operating System (OS)" BIOS subsystem boot operation and that an SCP boot progress code for the dependent "smart NIC services ready" SCP subsystem boot operation has not yet been received from the SCP subsystem 304 at block 604.

In a specific example of block 608, in response to determining that the BIOS subsystem initialization operation progress information received from the BIOS subsystem 308 at block 604 indicates that the BIOS subsystem 308 is about to perform a BIOS subsystem initialization operation that is dependent on an SCP subsystem initialization operation for which SCP subsystem initialization operation progress information has not yet been received from the SCP subsystem 304 at block 602, the BMC engine 504 in the BMC subsystem 310/500 may generate an "XOFF" initialization pause communication (e.g., an American Standard Code for Information Interchange (ASCII) character XOFF command) and transmit that XOFF initialization pause communication via a serial communication link to the BIOS subsystem 308.

For example, at block 608, the BMC engine 504 in the BMC subsystem 310/500 may utilize a serial communication link (e.g., to a serial port coupled to the BIOS subsystem 308), which one of skill in the art in possession of the present disclosure will recognize is typically available to a user of the computing system 202a/300 for controlling the operations of the BIOS subsystem 308 via an input device such as a keyboard, to transmit the "XOFF" initialization pause communication to the BIOS subsystem 308. As will be appreciated by one of skill in the art in possession of the present disclosure, upon receiving the "XOFF" initialization pause communication, the BIOS subsystem 308 will pause its performance of the BIOS subsystem initialization operations (i.e., prior to performing the BIOS subsystem initialization operation that is dependent on an SCP subsystem initialization operation for which SCP subsystem initialization operation progress information has not yet been received from the SCP subsystem 304), and will not resume its performance of the BIOS subsystem initialization operations unless an "XON" initialization resume communication is received, discussed in further detail below. However, while a specific technique for pausing the BIOS subsystem initialization operations is described above, one of skill in the art in possession of the present disclosure will appreciate that other techniques for pausing the BIOS subsystem initialization operations will fall within the scope of the present disclosure as well.

The method 600 then proceeds to decision block 610 where it is determined whether the second initialization operation has been completed. In an embodiment, at decision block 610 and subsequent to sending the BIOS subsystem initialization pause communication to the BIOS subsystem 308 at block 608, the BMC engine 504 in the BMC subsystem 310/500 may operate to monitor for an SCP subsystem initialization progress communication from the SCP subsystem 304 that indicates that the SCP subsystem 304 has completed the SCP subsystem initialization operation for which the BIOS subsystem 308 was paused before performing the BIOS subsystem initialization operation that is dependent on that SCP subsystem initialization operation. Continuing with the specific examples provided above, at block 608, the BMC engine 504 in the BMC subsystem 310/500 may operate to monitor for an SCP subsystem boot progress code from the SCP subsystem 304 that indicates that the SCP subsystem 304 has completed the SCP subsystem initialization operation for which the BIOS subsystem 308 was paused before performing the BIOS subsystem initialization operation that is dependent on that SCP subsystem initialization operation.

If, at decision block 610, it is determined that the second initialization operation has not been completed, the method 600 proceeds to decision block 612 where it is determined whether an initialization pause timeout has been reached. In an embodiment, at decision block 612 and as part of the beginning of the monitoring for the SCP subsystem initialization progress communication from the SCP subsystem 304 that indicates that the SCP subsystem 304 has completed the SCP subsystem initialization operation for which the BIOS subsystem 308 was paused before performing the BIOS subsystem initialization operation that is dependent on that SCP subsystem initialization operation, the BMC engine 504 in the BMC subsystem 310/500 may access the BMC database 506 and identify the timeout amount in the timeout column 708c of the initialization operation dependency table 708 associated with the BIOS boot progress code/SCP boot progress code dependency for which the BIOS subsystem initialization pause communication was sent at block 608. Furthermore, in response to identifying that timeout amount, the BMC engine 504 in the BMC subsystem 310/500 may begin a timer to monitor for whether that timeout amount has expired (i.e., before receiving the SCP subsystem initialization progress communication from the SCP subsystem 304 that indicates that the SCP subsystem 304 has completed the SCP subsystem initialization operation for which the BIOS subsystem 308 was paused before performing the BIOS subsystem initialization operation that is dependent on that SCP subsystem initialization operation.)

As such, referring back to the specific example of the initialization operation dependency table 708, at block 610 the BMC engine 504 in the BMC subsystem 310/500 may identify the 10 second timeout amount corresponding to the "start PCI scan" BIOS subsystem boot operation/"PCI subsystem and device mapping ready" SCP subsystem boot operation dependency for which the BIOS subsystem initialization operations were paused at block 608, or identify the 30 second timeout amount corresponding to the "BIOS setup" BIOS subsystem boot operation/"SCP configuration database ready" SCP subsystem boot operation dependency for which the BIOS subsystem initialization operations were paused at block 608, or identify the 30 second timeout amount corresponding to the "boot device scan" BIOS subsystem boot operation/"boot device discovery complete" SCP subsystem boot operation dependency for which the BIOS subsystem initialization operations were paused at block 608, or identify the 20 second timeout amount corresponding to the "post complete-boot Operating System (OS)" BIOS subsystem boot operation/"smart NIC services ready" SCP subsystem boot operation dependency for which the BIOS subsystem initialization operations were paused at block 608. Thus, at block 610, the BMC engine 504 in the BMC subsystem 310/500 may determine whether the timeout amount for the BIOS subsystem initialization operation/SCP subsystem initialization operation dependency has expired.

If, at decision block 612, it is determined that the initialization pause timeout has not been reached, the method 600 may return to decision block 610. As such, the method 600 may loop through decision blocks 610 and 612 following the pausing of the BIOS subsystem initialization operations at block 608 in order to determine whether the SCP subsystem initialization operation (for which the BIOS subsystem 308 was paused before performing the BIOS subsystem initialization operation that is dependent on that SCP subsystem initialization operation) is completed before the timeout amount associated with its corresponding BIOS subsystem initialization operation/SCP subsystem initialization operation dependency.

If, at decision block 612, it is determined that the initialization pause timeout has been reached, the method 600 may proceed to block 614 where the coordinated initialization subsystem performs initialization failure operations. In an embodiment, at block 614 and in response to determining that the initialization pause timeout has been reached prior to the completion of the SCP subsystem initialization operation (for which the BIOS subsystem 308 was paused before performing the BIOS subsystem initialization operation that is dependent on that SCP subsystem initialization operation), the BMC engine 504 in the BMC subsystem 310/500 may perform initialization failure operations such as, for example, resetting the SCP subsystem 304 in order to restart its performance of the SCP subsystem initialization operations, troubleshooting possible network connectivity issues for the SCP subsystem 304, sending an alert to an SCP subsystem/computing system administrator, reporting SCP subsystem diagnostic information to an SCP subsystem/computing system administrator, and/or performing any of a variety of other initialization failure operations that would be apparent to one of skill in the art in possession of the present disclosure.

Furthermore, in some examples, the BMC engine 504 in the BMC subsystem 310/500 may prevent the BIOS subsystem 308 from resuming the BIOS subsystem initialization operations to prevent the initialization of the computing system 202a/300 in response to determining that the initialization pause timeout has been reached prior to the completion of the SCP subsystem initialization operation (for which the BIOS subsystem 308 was paused before performing the BIOS subsystem initialization operation that is dependent on that SCP subsystem initialization operation). However, in other examples, the BMC engine 504 in the BMC subsystem 310/500 may allow the BIOS subsystem 308 to resume the BIOS subsystem initialization operations to allow for the initialization of the computing system 202a/300 in response to determining that the initialization pause timeout has been reached prior to the completion of the SCP subsystem initialization operation (for which the BIOS subsystem 308 was paused before performing the BIOS subsystem initialization operation that is dependent on that SCP subsystem initialization operation), which one of skill in the art in possession of the present disclosure will recognize may allow for runtime operation of the computing system 202a/300 without some or all of the functionality of the SCP subsystem 304. However, while several specific examples of initialization failure operations have been described, one of skill in the art in possession of the present disclosure will appreciate that a variety of actions may be performed if the SCP subsystem 304 does not complete an SCP subsystem initialization operation upon which a BIOS subsystem initialization operation is dependent while remaining within the scope of the present disclosure as well.

Figure 7G:
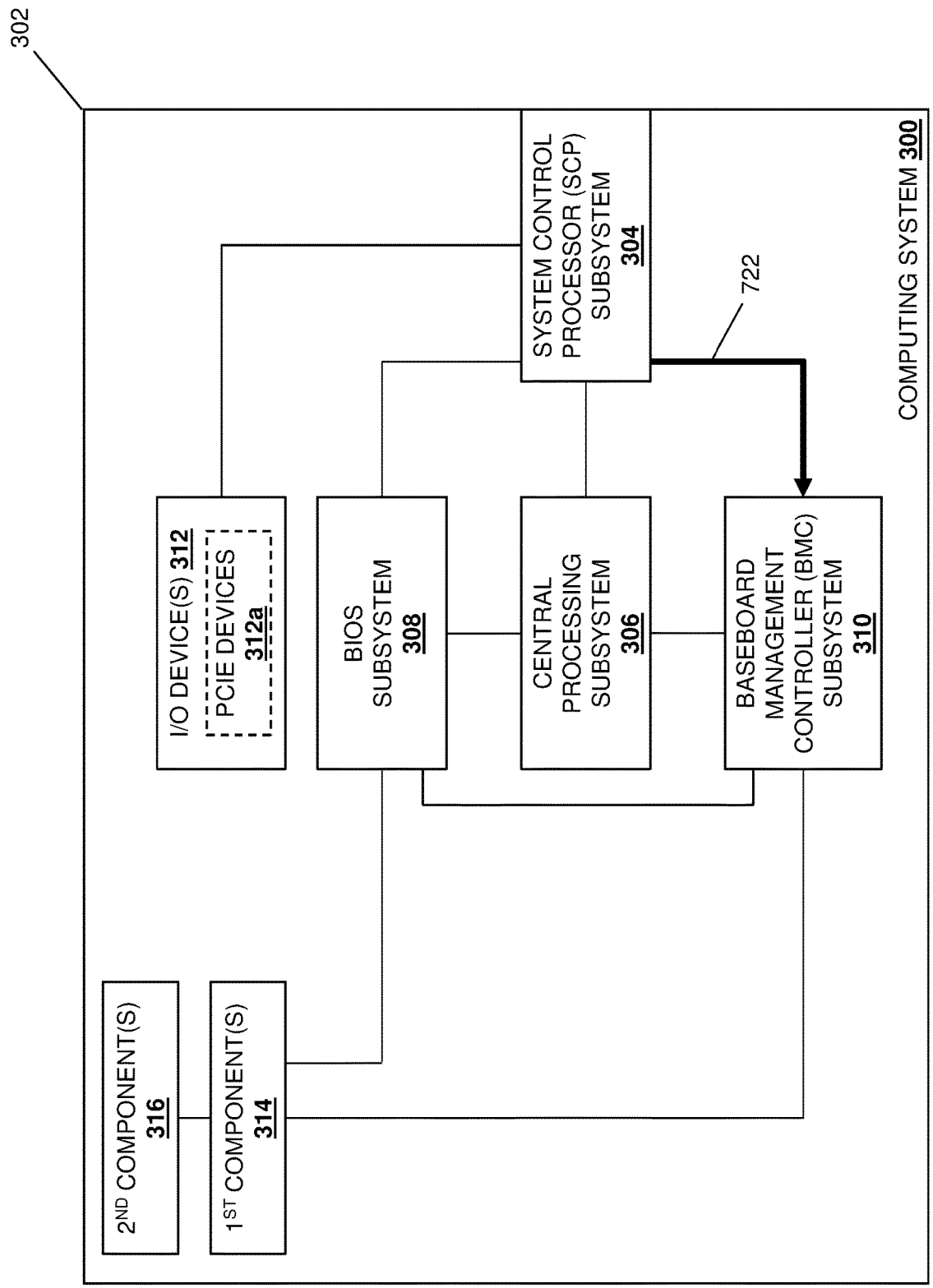
FIG. 7G is a schematic view illustrating an embodiment of the computing system of FIG. 3 operating during the method of FIG. 6.

If, at decision block 610, it is determined that the second initialization operations have been completed, the method 600 may proceed to block 616 where the coordinated initialization subsystem sends an initialization resume communication to the first initialization subsystem. With reference to FIG. 7G, at decision block 610 the SCP engine 404 in the SCP subsystem 304/400 may complete the SCP subsystem initialization operation for which the BIOS subsystem 308 was paused before performing the BIOS subsystem initialization operation that is dependent on that SCP subsystem initialization operation and, in response, may perform SCP subsystem initialization operation completed communication operations 722 that include transmitting an SCP subsystem initialization operation progress communication to the BMC subsystem 310 in substantially the same manner as discussed above with regard to block 604, with that SCP subsystem initialization operation progress communication indicating that the SCP subsystem 304 has completed the SCP subsystem initialization operation for which the BIOS subsystem 308 was paused before performing the BIOS subsystem initialization operation that is dependent on that SCP subsystem initialization operation.

Figure 7H:
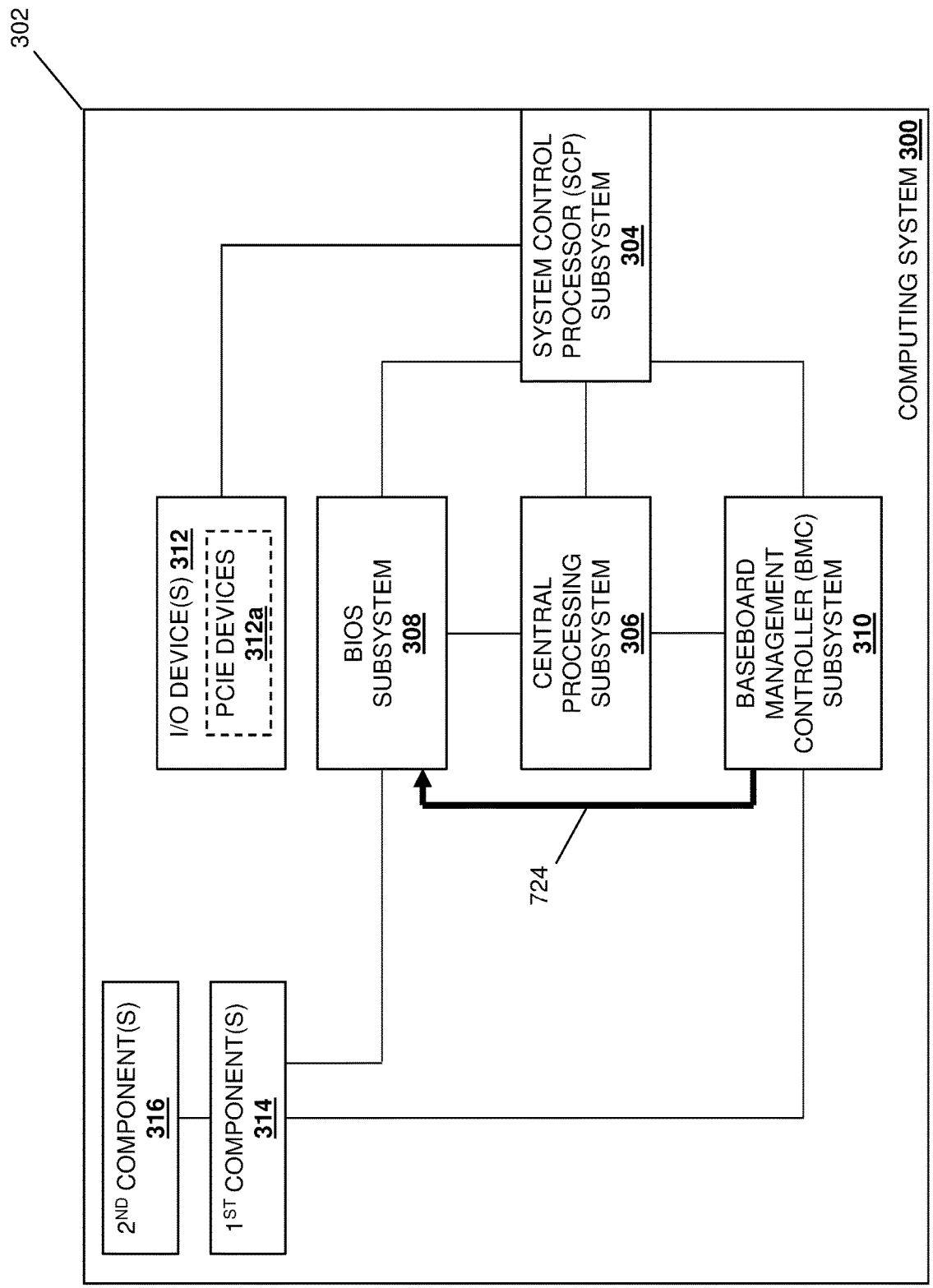
FIG. 7H is a schematic view illustrating an embodiment of the computing system of FIG. 3 operating during the method of FIG. 6.

With reference to FIG. 7H, in an embodiment of block 616 and in response to determining that an SCP subsystem initialization progress communication has been received from the SCP subsystem 304 that indicates that the SCP subsystem 304 has completed the SCP subsystem initialization operation for which the BIOS subsystem 308 was paused before performing the BIOS subsystem initialization operation that is dependent on that SCP subsystem initialization operation, the BMC engine 504 in the BMC subsystem 310/500 may perform BIOS subsystem initialization resume communication transmission operations 724 to generate and transmit a BIOS subsystem initialization resume communication to the BIOS subsystem 308.

For example, with reference to the example of the initialization operation dependency table 708 in the BMC database 506 discussed above, at decision block 606 the BMC engine 504 may determine that an SCP boot progress code received from the SCP subsystem 304 identifies that the "PCI subsystem and device mapping ready" SCP subsystem boot operation has been completed, or identifies that the "SCP configuration database ready" SCP subsystem boot operation has been completed, or identifies that the "boot device discovery complete" SCP subsystem boot operation has been completed, or identifies that the "smart NIC services ready" SCP subsystem boot operation has been completed. In a specific example of block 616, in response to determining that the SCP subsystem 304 has completed the SCP subsystem initialization operation for which the BIOS subsystem 308 was paused before performing the BIOS subsystem initialization operation that is dependent on that SCP subsystem initialization operation, the BMC engine 504 in the BMC subsystem 310/500 may generate an "XON" initialization resume communication (e.g., an ASCII character XON command) and transmit that XON initialization resume communication via a serial communication link to the BIOS subsystem 308.

Similarly as discussed above, at block 608, the BMC engine 504 in the BMC subsystem 310/500 may utilize a serial communication link (e.g., to a serial port coupled to the BIOS subsystem 308), which one of skill in the art in possession of the present disclosure will recognize is typically available to a user of the computing system 202a/300 for controlling the operations of the BIOS subsystem 308 via an input device such as a keyboard, to transmit the "XON" initialization resume communication to the BIOS subsystem 308. As will be appreciated by one of skill in the art in possession of the present disclosure, upon receiving the "XON" initialization resume communication, the BIOS subsystem 308 will resume its performance of the BIOS subsystem initialization operations (i.e., to perform the BIOS subsystem initialization operation that is dependent on the SCP subsystem initialization operation for which SCP subsystem initialization operation progress information was received from the SCP subsystem 304 at decision block 610). However, while a specific technique for resuming the BIOS subsystem initialization operations is described above, one of skill in the art in possession of the present disclosure will appreciate that other techniques for resuming the BIOS subsystem initialization operations will fall within the scope of the present disclosure as well.

The method 600 then returns to block 602. As such, the method 600 may loop to allow the SCP subsystem 304 and the BIOS subsystem 308 to initialize in parallel, while pausing the BIOS subsystem initialization operations being performed by the BIOS subsystem 308 if any one of those BIOS subsystem initialization operations is about to be performed and is dependent on an SCP subsystem initialization operation that has not yet been performed by the SCP subsystem 304, and resuming the BIOS subsystem initialization operations by the BIOS subsystem 308 once that SCP subsystem initialization operation has been performed by the SCP subsystem 304.

Thus, systems and methods have been described that provide for the initialization of an SCP subsystem and a BIOS subsystem in a server device in a coordinated manner such that any BIOS subsystem initialization operations that are performed by the BIOS subsystem and that are dependent on any SCP subsystem initialization operations performed by the SCP subsystem may be paused until those SCP subsystem initialization operations are completed to allow parallel initialization of SCP subsystem and BIOS subsystem with dependent initialization operations. For example, the coordinated initialization system of the present disclosure may include a server device with an SCP subsystem and a BIOS subsystem coupled to a BMC subsystem. The BMC subsystem receives SCP subsystem initialization progress information and BIOS subsystem initialization progress information associated with respective SCP subsystem initialization operations and BIOS subsystem initialization operations performed by the respective SCP subsystem and BIOS subsystem. Using a BMC database that identifies dependences between the SCP subsystem initialization operations and the BIOS subsystem initialization operations, the BMC subsystem determines that the BIOS subsystem initialization progress information identifies a BIOS subsystem initialization operation that is going to be performed by the BIOS subsystem and that is dependent on an SCP subsystem initialization operation that is identified by the SCP subsystem initialization progress information and that has not yet been performed by the SCP subsystem and, in response, causes the BIOS subsystem to pause the BIOS subsystem initialization operations until the SCP subsystem initialization operation has been performed. As such, the initialization time for a server device with an SCP subsystem and a BIOS subsystem may be reduced relative to conventional server devices with an SCP subsystem and a BIOS subsystem.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A coordinated initialization system, comprising:
   a computing system;
   a first initialization subsystem that is included in the computing system and that is configured to perform first initialization subsystem operations that configure the computing system to provide an operating system;
   a second initialization subsystem that is included in the computing system and that is configured to perform second initialization subsystem operations that configure at least one device for use in the first initialization subsystem operations; and
   a coordinated initialization subsystem that is included in the computing system and that is coupled to each of the first initialization subsystem and the second initialization subsystem, wherein the coordinated initialization subsystem is configured to:
      receive, from the first initialization subsystem subsequent to an initialization command being provided to the computing system, first initialization progress information associated with the first initialization subsystem operations that are being performed by the first initialization subsystem;
      receive, from the second initialization subsystem subsequent to the initialization command being provided to the computing system, second initialization progress information associated with the second initialization subsystem operations that are being performed by the second initialization subsystem while the first initialization subsystem performs the first initialization subsystem operations;
      determine, using a coordinated initialization database that identifies dependences between the first initialization subsystem operations and the second initialization operations, that the first initialization progress information identifies a first initialization operation that is going to be performed by the first initialization subsystem as part of the first initialization subsystem operations and that is dependent on a second initialization operation that is identified by the second initialization progress information and that has not yet been performed by the second initialization subsystem as part of the second initialization subsystem operations; and
      cause, in response to determining that the first initialization operation that is going to be performed by the first initialization subsystem is dependent on the second initialization operation that has not yet been performed by the second initialization subsystem, the first initialization subsystem to pause the first initialization subsystem operations until the second initialization operation has been performed.

2. The system of claim 1, wherein the first initialization subsystem is a Basic Input/Output System (BIOS) subsystem.

3. The system of claim 1, wherein second initialization subsystem is a System Control Processor (SCP) subsystem.

4. The system of claim 1, wherein the coordinated initialization subsystem is a Baseboard Management Controller (BMC) subsystem.

5. The system of claim 1, wherein the causing the first initialization subsystem to pause the first initialization subsystem operations until the second initialization operation has been performed includes:

transmitting, to the first initialization subsystem via a serial connection, an XOFF command that is configured to cause the first initialization subsystem to pause the first initialization subsystem operations such that the first initialization operation is not performed by the first initialization subsystem;

receiving, from the second initialization subsystem, third initialization progress information associated with the second initialization subsystem operations performed by the second initialization subsystem;

determine that the third initialization progress information identifies that the second initialization operation has been performed by the second initialization subsystem; and transmitting, to the first initialization subsystem via the serial connection in response to determining that the second initialization operation has been performed by the second initialization subsystem, an XON command that is configured to cause the first initialization subsystem to resume the first initialization subsystem operations such that the first initialization operation is performed by the first initialization subsystem.

6. The system of claim 1, wherein the coordinated initialization subsystem is configured to:

receive, from the first initialization subsystem, third initialization progress information associated with first initialization subsystem operations that are being performed by the first initialization subsystem;

receive, from the second initialization subsystem, fourth initialization progress information associated with second initialization subsystem operations that are being performed by the second initialization subsystem while the first initialization subsystem performs the first initialization subsystem operations;

determine, using the coordinated initialization database that identifies dependences between the first initialization subsystem operations and the second initialization operations, that the third initialization progress information identifies a third initialization operation that is going to be performed by the first initialization subsystem as part of the first initialization subsystem operations and that is dependent on a fourth initialization operation that is identified by the fourth initialization progress information and that has not yet been performed by the second initialization subsystem as part of the second initialization subsystem operations;

cause, in response to determining that the third initialization operation that is going to be performed by the first initialization subsystem is dependent on the fourth initialization operation that has not yet been performed by the second initialization subsystem, the first initialization subsystem to pause the third initialization subsystem operations;

determine that the fourth initialization operation has not been performed by the second initialization subsystem for a time period subsequent to causing the first initialization subsystem to pause the third initialization subsystem operations; and perform, in response to determining that the fourth initialization operation has not been performed by the second initialization subsystem for the time period, a second initialization subsystem failure operation.

7. An Information Handling System (IHS), comprising:
a processing system; and
a memory system that is coupled to the processing system and that includes instructions that, when executed by the processing system, cause the processing system to provide a coordinated initialization engine that is configured to:

receive, from a first initialization subsystem in a computing system subsequent to an initialization command being provided to the computing system, first initialization progress information associated with first initialization subsystem operations that are being performed by the first initialization subsystem and that configure the computing system to provide an operating system;

receive, from a second initialization subsystem in the computing system subsequent to the initialization command being provided to the computing system, second initialization progress information associated with second initialization subsystem operations that are being performed by the second initialization subsystem while the first initialization subsystem performs the first initialization subsystem operations and that configure at least one device for use in the first initialization subsystem operations;

determine, using a coordinated initialization database that identifies dependences between the first initialization subsystem operations and the second initialization operations, that the first initialization progress information identifies a first initialization operation that is going to be performed by the first initialization subsystem as part of the first initialization subsystem operations and that is dependent on a second initialization operation that is identified by the second initialization progress information and that has not yet been performed by the second initialization subsystem as part of the second initialization subsystem operations; and cause, in response to determining that the first initialization operation that is going to be performed by the first initialization subsystem is dependent on the second initialization operation that has not yet been performed by the second initialization subsystem, the first initialization subsystem to pause the first initialization subsystem operations until the second initialization operation has been performed.

8. The IHS subsystem of claim 7, wherein the first initialization subsystem is a Basic Input/Output System (BIOS) subsystem.

9. The IHS of claim 7, wherein second initialization subsystem is a System Control Processor (SCP) subsystem.

10. The IHS of claim 7, wherein the coordinated initialization engine is configured to:
perform at least one Baseboard Management Controller (BMC) operation.

11. The IHS of claim 7, wherein the causing the first initialization subsystem to pause the first initialization subsystem operations until the second initialization operation has been performed includes:

transmitting, to the first initialization subsystem via a serial connection, an XOFF command that is configured to cause the first initialization subsystem to pause the first initialization subsystem operations such that the first initialization operation is not performed by the first initialization subsystem;

receiving, from the second initialization subsystem, third initialization progress information associated with the second initialization subsystem operations performed by the second initialization subsystem;

determining that the third initialization progress information identifies that the second initialization operation has been performed by the second initialization subsystem; and transmitting, to the first initialization subsystem via the serial connection in response to determining that the second initialization operation has been performed by the second initialization subsystem, an XON command that is configured to cause the first initialization subsystem to resume the first initialization subsystem operations such that the first initialization operation is performed by the first initialization subsystem.

12. The IHS of claim 7, wherein the coordinated initialization engine is configured to:

receive, from the first initialization subsystem, third initialization progress information associated with first initialization subsystem operations that are being performed by the first initialization subsystem;

receive, from the second initialization subsystem, fourth initialization progress information associated with second initialization subsystem operations that are being performed by the second initialization subsystem while the first initialization subsystem performs the first initialization subsystem operations;

determine, using the coordinated initialization database that identifies dependences between the first initialization subsystem operations and the second initialization operations, that the third initialization progress information identifies a third initialization operation that is going to be performed by the first initialization subsystem as part of the first initialization subsystem operations and that is dependent on a fourth initialization operation that is identified by the fourth initialization progress information and that has not yet been performed by the second initialization subsystem as part of the second initialization subsystem operations;

cause, in response to determining that the third initialization operation that is going to be performed by the first initialization subsystem is dependent on the fourth initialization operation that has not yet been performed by the second initialization subsystem, the first initialization subsystem to pause the third initialization subsystem operations;

determine that the fourth initialization operation has not been performed by the second initialization subsystem for a time period subsequent to causing the first initialization subsystem to pause the third initialization subsystem operations; and perform, in response to determining that the fourth initialization operation has not been performed by the second initialization subsystem for the time period, a second initialization subsystem failure operation.

13. The IHS of claim 7, wherein the first initialization progress information includes at least one first initialization subsystem boot progress code, and wherein the second initialization progress information includes at least one second initialization subsystem boot progress code.

14. A method for coordinating initialization of multiple subsystems in a computing system, comprising:

receiving, by a coordinated initialization subsystem in a computing system from a first initialization subsystem in the computing system subsequent to an initialization command being provided to the computing system, first initialization progress information associated with first initialization subsystem operations that are being performed by the first initialization subsystem and that configure the computing system to provide an operating system;

receiving, by the coordinated initialization subsystem from a second initialization subsystem in the computing system subsequent to the initialization command being provided to the computing system, second initialization progress information associated with second initialization subsystem operations that are being performed by the second initialization subsystem while the first initialization subsystem performs the first initialization subsystem operations and that configure at least one device for use in the first initialization subsystem operations;

determining, by the coordinated initialization subsystem using a coordinated initialization database that identifies dependences between the first initialization subsystem operations and the second initialization operations, that the first initialization progress information identifies a first initialization operation that is going to be performed by the first initialization subsystem as part of the first initialization subsystem operations and that is dependent on a second initialization operation that is identified by the second initialization progress information and that has not yet been performed by the second initialization subsystem as part of the second initialization subsystem operations; and causing, by the coordinated initialization subsystem in response to determining that the first initialization operation that is going to be performed by the first initialization subsystem is dependent on the second initialization operation that has not yet been performed by the second initialization subsystem, the first initialization subsystem to pause the first initialization subsystem operations until the second initialization operation has been performed.

15. The method of claim 14, wherein the first initialization subsystem is a Basic Input/Output System (BIOS) subsystem.

16. The method of claim 14, wherein second initialization subsystem is a System Control Processor (SCP) subsystem.

17. The method of claim 14, wherein the coordinated initialization subsystem is a Baseboard Management Controller (BMC) subsystem.

18. The method of claim 14, wherein the causing the first initialization subsystem to pause the first initialization subsystem operations until the second initialization operation has been performed includes:

transmitting, by the coordinated initialization subsystem to the first initialization subsystem via a serial connection, an XOFF command that is configured to cause the first initialization subsystem to pause the first initialization subsystem operations such that the first initialization operation is not performed by the first initialization subsystem;

receiving, by the coordinated initialization subsystem from the second initialization subsystem, third initialization progress information associated with the second initialization subsystem operations performed by the second initialization subsystem;

determining, by the coordinated initialization subsystem, that the third initialization progress information identifies that the second initialization operation has been performed by the second initialization subsystem; and transmitting, by the coordinated initialization subsystem to the first initialization subsystem via the serial connection in response to determining that the second initialization operation has been performed by the second initialization subsystem, an XON command that is configured to cause the first initialization subsystem to resume the first initialization subsystem operations such that the first initialization operation is performed by the first initialization subsystem.

19. The method of claim 14, further comprising:

receiving, by the coordinated initialization subsystem from the first initialization subsystem, third initialization progress information associated with first initialization subsystem operations that are being performed by the first initialization subsystem;

receiving, by the coordinated initialization subsystem from the second initialization subsystem, fourth initialization progress information associated with second initialization subsystem operations that are being performed by the second initialization subsystem while the first initialization subsystem performs the first initialization subsystem operations;

determining, by the coordinated initialization subsystem using the coordinated initialization database that identifies dependences between the first initialization subsystem operations and the second initialization subsystem operations, that the third initialization progress information identifies a third initialization operation that is going to be performed by the first initialization subsystem as part of the first initialization subsystem operations and that is dependent on a fourth initialization operation that is identified by the fourth initialization progress information and that has not yet been performed by the second initialization subsystem as part of the second initialization subsystem operations;

causing, by the coordinated initialization subsystem in response to determining that the third initialization operation that is going to be performed by the first initialization subsystem is dependent on the fourth initialization operation that has not yet been performed by the second initialization subsystem, the first initialization subsystem to pause the third initialization subsystem operations;

determining, by the coordinated initialization subsystem, that the fourth initialization operation has not been performed by the second initialization subsystem for a time period subsequent to causing the first initialization subsystem to pause the third initialization subsystem operations; and performing, by the coordinated initialization subsystem in response to determining that the fourth initialization operation has not been performed by the second initialization subsystem for the time period, a second initialization subsystem failure operation.

20. The method of claim 14, wherein the first initialization progress information includes at least one first initialization subsystem boot progress code, and wherein the second initialization progress information includes at least one second initialization subsystem boot progress code.

* * * * *